US012535752B2

(12) United States Patent
Nagai et al.

(10) Patent No.: US 12,535,752 B2
(45) Date of Patent: Jan. 27, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Ryo Nagai, Kanagawa (JP); Yosuke Tsurumi, Kanagawa (JP); Yasuko Torii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 503 days.

(21) Appl. No.: 18/155,077

(22) Filed: Jan. 17, 2023

(65) Prior Publication Data

US 2023/0305418 A1 Sep. 28, 2023

(30) Foreign Application Priority Data

Mar. 23, 2022 (JP) ................................ 2022-047572
Aug. 26, 2022 (JP) ................................ 2022-135109
Sep. 22, 2022 (JP) ................................ 2022-151970

(51) Int. Cl.
*G03G 9/097* (2006.01)
*G03G 9/08* (2006.01)
(Continued)

(52) U.S. Cl.
CPC ....... *G03G 9/09725* (2013.01); *G03G 9/0819* (2013.01); *G03G 9/0823* (2013.01);
(Continued)

(58) Field of Classification Search
None
See application file for complete search history.

(56) References Cited

U.S. PATENT DOCUMENTS 11,067,913 B1 7/2021 Inukai et al.
11,126,099 B2 9/2021 Yamagishi et al.
(Continued)

FOREIGN PATENT DOCUMENTS

EP 1065570 1/2001
JP 2004-220005 * 8/2004 ............ G03G 9/087
(Continued)

OTHER PUBLICATIONS

Translation of JP 2004-220005.*
(Continued)

*Primary Examiner* — Peter L Vajda
(74) *Attorney, Agent, or Firm* — JCIPRNET

(57) ABSTRACT

An electrostatic charge image developing toner contains negatively charged toner particles and silica particles added to an exterior of the toner particles, in which in a case where the silica particles are sorted into silica particles (S1) having a circularity of 0.91 or more and silica particles (S2) having a circularity less than 0.91, a mass ratio N/Si of a nitrogen element to a silicon element in a group of the silica particles (S1) is 0.005 or more and 0.50 or less, a mass ratio N/Si of a nitrogen element to a silicon element in a group of the silica particles (S2) is less than 0.005, and an average circularity of the silica particles (S2) is 0.84 or more and less than 0.91.

19 Claims, 2 Drawing Sheets

(51) Int. Cl.
*G03G 9/087* (2006.01)
*G03G 15/02* (2006.01)
*G03G 15/08* (2006.01)

(52) U.S. Cl.
CPC ......... *G03G 9/0825* (2013.01); *G03G 9/0827* (2013.01); *G03G 9/08755* (2013.01); *G03G 9/09708* (2013.01); *G03G 15/02* (2013.01); *G03G 15/0865* (2013.01); *G03G 15/0868* (2013.01)

(56) References Cited

U.S. PATENT DOCUMENTS

| | | | | |
|---|---|---|---|---|
| 11,126,102 | B2 | 9/2021 | Hashimoto et al. | |
| 11,188,004 | B2 | 11/2021 | Noguchi et al. | |
| 2016/0154331 | A1 | 6/2016 | Tanaka et al. | |
| 2017/0227870 | A1* | 8/2017 | Iida | G03G 9/08782 |
| 2017/0315459 | A1 | 11/2017 | Iguchi et al. | |
| 2021/0072657 | A1 | 3/2021 | Watanabe et al. | |
| 2021/0080844 | A1* | 3/2021 | Igarashi | G03G 5/0732 |
| 2021/0216026 | A1* | 7/2021 | Inukai | G03G 9/08755 |

FOREIGN PATENT DOCUMENTS

| | | | | |
|---|---|---|---|---|
| JP | 2006317489 | | 11/2006 | |
| JP | 2009-036980 | * | 2/2009 | G03G 9/08 |
| JP | 2017039618 | | 2/2017 | |
| JP | 2020154260 | | 9/2020 | |
| JP | 2021047318 | | 3/2021 | |
| JP | 2021110902 | | 8/2021 | |
| JP | 2021110903 | | 8/2021 | |
| JP | 2021124534 | | 8/2021 | |

OTHER PUBLICATIONS

Translation of JP 2009-036980.*
"Search Report of Europe Counterpart Application", issued on Jul. 24, 2023, pp. 1-7.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-135109 filed Aug. 26, 2022, Japanese Patent Application No. 2022-047572 filed Mar. 23, 2022, and Japanese Patent Application No. 2022-151970 filed Sep. 22, 2022.

BACKGROUND

(i) Technical Field

The present disclosure relates to an electrostatic charge image developing toner, an electrostatic charge image developer, a toner cartridge, a process cartridge, an image forming apparatus, and an image forming method.

(ii) Related Art

JP2020-154260A discloses an electrostatic charge image developing toner containing toner base particles that contain a colorant and a binder resin, first silica particles that have a siloxane compound on a surface thereof, and second silica particles that have oil, in which a BET specific surface area of the first silica particles is 80 $m^2/g$ or more and 240 $m^2/g$ or less, a BET specific surface area of the second silica particles is 20 $m^2/g$ or more and 120 $m^2/g$ or less, a content Ms of the siloxane compound and a content Mo of the oil with respect to a total amount of the toner satisfy a ratio Ms/Mo=1/100,000 or more and 2/100 or less, and the BET specific surface area of the first silica particles is larger than the BET specific surface area of the second silica particles.

JP2017-039618A discloses silica powder containing a plurality of silica particles composed of a silica structure having a Si—O bond as a repeating unit and a quaternary ammonium salt introduced into the structure.

JP2006-317489A discloses an electrophotographic toner containing a base toner having an average circularity of 0.94 to 0.995 and a volume-average particle size of 3 to 9 μm and melamine cyanurate powder having a volume-average particle size of 3 to 9 μm, in which the amount of the melamine cyanurate powder added to the base toner is 0.1 to 2.0 parts by weight with respect to 100 parts by weight of the base toner.

JP2021-110902A discloses an electrostatic charge image developing toner containing toner particles, layered compound particles, and inorganic particles, in which a Ti content is 0.1 ppm or more and less than 1,500 ppm.

JP2021-110903A discloses an electrostatic charge image developing toner containing toner particles, layered compound particles, and inorganic particles, in which a ratio of irregular shaped inorganic particles having a circularity of 0.5 or more and 0.9 or less and a particle size of 0.015 μm or more and 0.350 μm or less to the entire inorganic particles is 2% by number or more and 70% by number or less.

JP2021-124534A discloses an electrostatic charge image developing toner containing toner particles, layered compound particles, and inorganic particles, in which an isolation rate Fa of the layered compound particles isolated from the toner particles is 5% by volume or more and 20% by volume or less.

JP2021-047318A discloses an electrostatic charge image developing toner containing toner particles, layered compound particles, and inorganic particles, in which an average circularity of the inorganic particles is 0.910 or more and 0.995 or less, and a ratio Da/db of a number-average particle size Da of the layered compound particles to a number-average particle size db of the inorganic particles is 1.2 or more and 43 or less.

SUMMARY

Aspects of non-limiting embodiments of the present disclosure relate to an electrostatic charge image developing toner that has better fluidity, compared to an electrostatic charge image developing toner in which a mass ratio N/Si of a nitrogen element to a silicon element in a group of silica particles (S1) having a circularity of 0.91 or more is less than 0.005 or more than 0.50.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above object include the following aspects.

According to an aspect of the present disclosure, there is provided an electrostatic charge image developing toner containing:

negatively charged toner particles; and silica particles added to an exterior of the toner particles, in which in a case where the silica particles are sorted into silica particles (S1) having a circularity of 0.91 or more and silica particles (S2) having a circularity less than 0.91, a mass ratio N/Si of a nitrogen element to a silicon element in a group of the silica particles (S1) is 0.005 or more and 0.50 or less, a mass ratio N/Si of a nitrogen element to a silicon element in a group of the silica particles (S2) is less than 0.005, and an average circularity of the silica particles (S2) is 0.84 or more and less than 0.91.

BRIEF DESCRIPTION OF THE DRAWINGS

Exemplary embodiment(s) of the present invention will be described in detail based on the following figures, wherein.

DETAILED DESCRIPTION

Figure 1:
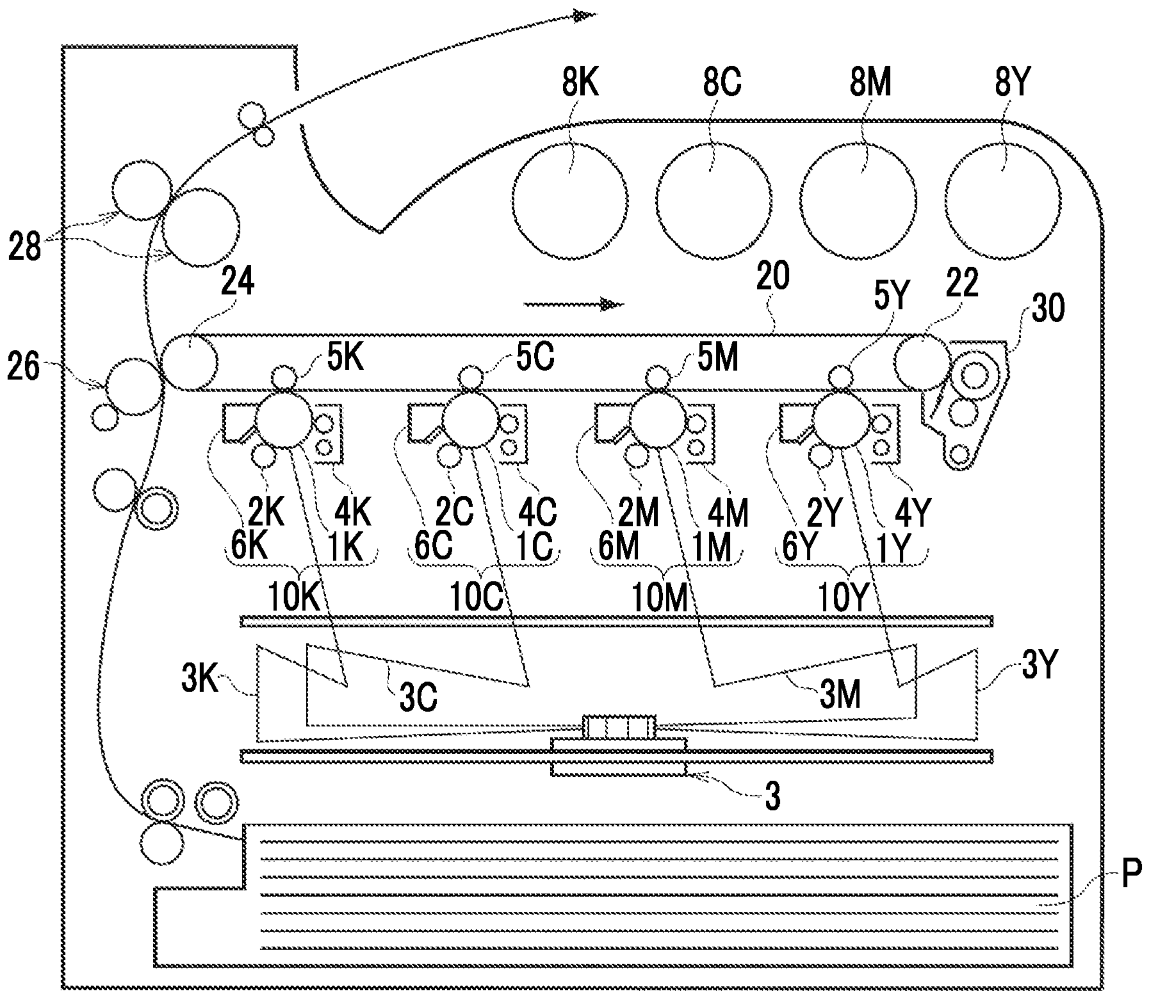
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, "(meth)acryl" is an expression including both the acryl and methacryl, and "(meth)acrylate" is an expression including both the acrylate and methacrylate.

In the present disclosure, "electrostatic charge image developing toner" is also called "toner", "electrostatic charge image developer" is also called "developer", and "electrostatic charge image developing carrier" is also called "carrier".

Electrostatic Charge Image Developing Toner

The toner according to the present exemplary embodiment contains negatively charged toner particles and silica particles that are added to an exterior of the negatively charged toner particles. In a case where the silica particles are sorted into silica particles (S1) having a circularity of 0.91 or more and silica particles (S2) having a circularity less than 0.91, a mass ratio N/Si of a nitrogen element to a silicon element in a group of the silica particles (S1) is 0.005 or more and 0.50 or less, a mass ratio N/Si of a nitrogen element to a silicon element in a group of the silica particles (S2) is less than 0.005, and an average circularity of the silica particles (S2) is 0.84 or more and less than 0.91.

The toner according to the present exemplary embodiment has excellent fluidity. The mechanism is presumed as below.

In the related art, silica particles having a relatively low circularity (that is, silica particles having irregularities on the surface) are used as an external additive for a toner. The silica particles having a relatively low circularity are unlikely to roll on the toner particles and unlikely to be unevenly distributed on the toner particles. Therefore, such silica particles are very effective for maintaining the fluidity of a toner. However, in a case where the toner is transported under strong mechanical stress, sometimes the silica particles are unevenly distributed or buried. Furthermore, in a high-temperature and high-humidity environment, sometimes the toner is aggregated.

Therefore, in the toner according to the present exemplary embodiment, silica particles having a relatively low circularity and silica particles containing an appropriate amount of a nitrogen element-containing compound and having a relatively high circularity are used in combination.

The silica particles containing an appropriate amount of a nitrogen element-containing compound have a relatively high circularity, and rolling of such particles on the surface of the toner particles suppresses shearing of the toner and prevents the burial of external additives. In a case where such particles move too much on the surface of the toner particles, the silica particles are isolated from the surface of the toner particles, the silica particles having a relatively low circularity are buried, and the fluidity of the toner deteriorates. However, in the particles containing an appropriate amount of a nitrogen element-containing compound, the positively polarized nitrogen atom exerts an anchoring effect on the negatively charged toner particles. Therefore, the silica particles do not move to such a degree that the silica particles are isolated from the surface of the negatively charged toner particles. In addition, the silica particles having a relatively low circularity that are between the silica particles containing an appropriate amount of a nitrogen element-containing compound are unlikely to roll, which suppress uneven distribution of both the particles. The silica particles containing a nitrogen element-containing compound contains a nitrogen element in such an amount that does not negatively affect the negative charging properties of the toner while allowing the anchoring effect to be exerted on the negatively charged toner particles.

In order that the silica particles containing a nitrogen element-containing compound is extremely uniformly added to the exterior of the negatively charged toner particles during the manufacturing of the toner even though positively polarized nitrogen atoms are present, it is preferable that the circularity of such silica particles be relatively high, for example. In a case where the circularity of the silica particles containing a nitrogen element-containing compound is low, these silica particles are likely to be unevenly dispersed on the negatively charged toner particles, which limits the effect of restricting the rolling range of the silica particles having a relatively low circularity and the effect of preventing the mechanical stress from being applied to the silica particles having a relatively low circularity.

In the present exemplary embodiment, from the viewpoint of making it easy to add the silica particles (S2) to the exterior of the toner particles and making it difficult for the silica particles (S2) to roll on the toner particles, the average circularity of the silica particles (S2) is 0.84 or more and less than 0.91, and is, for example, preferably 0.84 or more and 0.90 or less, and more preferably 0.85 or more and 0.88 or less.

In the present exemplary embodiment, from the viewpoint of making it easy to add the silica particles (S1) to the exterior of the toner particles, the average circularity of the silica particles (S1) is, for example, preferably 0.91 or more, more preferably 0.93 or more, and even more preferably 0.95 or more. The upper limit of the average circularity of the silica particles (S1) is, for example, 1.00 or less, 0.99 or less, and 0.98 or less.

In the present exemplary embodiment, from the viewpoint of appropriate content of the nitrogen element-containing compound, the mass ratio N/Si of a nitrogen element to a silicon element in a group of the silica particles (S1) is 0.005 or more and 0.50 or less.

In a case where the mass ratio N/Si is less than 0.005, the anchoring effect on the negatively charged toner particles is weak. From the viewpoint of obtaining the anchoring effect on the negatively charged toner particles, the mass ratio N/Si is 0.005 or more, for example, preferably 0.015 or more, more preferably 0.040 or more, and even more preferably 0.050 or more.

In a case where the mass ratio N/Si is more than 0.50, the toner tends to be moist, and the fluidity of the toner is lowered. From the viewpoint of maintaining the fluidity of the toner, the mass ratio N/Si is 0.50 or less, and is, for example, preferably 0.45 or less, more preferably 0.40 or less, even more preferably 0.30 or less, and yet more preferably 0.20 or less.

In the present exemplary embodiment, the mass ratio N/Si of a nitrogen element to a silicon element in a group of silica particles is measured using an oxygen nitrogen analyzer (for example, EMGA-920 manufactured by HORIBA, Ltd.) for a total of 45 seconds, and determined as a mass ratio (N/Si) of a nitrogen element to a silicon element. As a pretreatment, the sample is dried in a vacuum at 100° C. for 24 hours or more to remove impurities such as ammonia.

In the present exemplary embodiment, the mass ratio N/Si of a nitrogen element to a silicon element in a group of the silica particles (S2) is less than 0.005. For example, the closer the mass ratio N/Si is to 0, the more preferable.

In the present exemplary embodiment, the average primary particle size D1 of the silica particles (S1) is, for example, preferably 10 nm or more and 120 nm or less, more preferably 20 nm or more and 100 nm or less, and even more preferably 30 nm or more and 90 nm or less.

In the present exemplary embodiment, the ratio D1/D2 of the average primary particle size D1 of the silica particles (S1) to the average primary particle size D2 of the silica particles (S2) is, for example, preferably 1 or more and 5 or less, more preferably 1.2 or more and 3 or less, and even more preferably 1.5 or more and 2.5 or less.

In the present exemplary embodiment, the circularity, average circularity, and average primary particle size of the silica particles are confirmed by the following method.

A toner is added to an aqueous solution in which a surfactant is dissolved, thereby preparing a dispersion. Ultrasonic waves are applied to the dispersion to remove external additives from the toner particles. The dispersion is centrifuged, and the silica particles are collected by specific gravity and dried. The silica particles are imaged using a scanning electron microscope (SEM) at 40,000× magnification. The silica particles in one field of view are analyzed using the image processing/analyzing software WinRoof (MITANI CORPORATION), and the silica particles are sorted into the silica particles (S1) having a circularity of 0.91 or more and the silica particles (S2) having a circularity less than 0.91. For each of the primary particles, an equivalent circular diameter, an area, and a perimeter are calculated, and circularity=$4\pi\times$(area of particle image)÷(perimeter of particle image) is calculated. In the circularity distribution, the circularity below which the cumulative percentage of particles having a lower circularity reaches 50% is defined as an average circularity. In the distribution of equivalent circular diameter, the equivalent circular diameter below which the cumulative percentage of particles having smaller equivalent circular diameter reaches 50% is defined as an average primary particle size.

Hereinafter, the configuration of the toner according to the present exemplary embodiment will be specifically described.

Negatively Charged Toner Particles

The negatively charged toner particles are composed, for example, of a binder resin and, as necessary, a colorant, a release agent, and other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, a polyester resin is preferable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC·HCL-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Colorant

Examples of colorants include pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and the like.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total amount of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral·petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

From the viewpoint of extremely uniformly dispersing and fixing the silica particles (S1), a release agent exposure rate on the surface of the toner particles is, for example, preferably 15% or more and 40% or less, more preferably 20% or more and 35% or less, and even more preferably 25% or more and 30% or less.

The release agent exposure rate on the surface of the toner particles is determined by the following method.

A toner is added to an aqueous solution in which a surfactant is dissolved, thereby preparing a dispersion. Ultrasonic waves are applied to the dispersion to remove external additives from the toner particles. The dispersion is centrifuged, and the toner particles are collected by specific gravity and dried. The spectrum of the surface of the toner particles is measured by X-ray photoelectron spectroscopy (XPS), and each peak of the carbon is orbital is compared with the waveform of the reference spectrum to specify the peak attributing to the release agent, the peak attributing to the binder resin, and the peak attributing to the colorant. The reference spectrum is an XPS spectrum measured in advance for each of the release agent, the binder resin, and the colorant constituting the toner particles. The total atomic % of the peak attributing to the release agent among the peaks of the carbon 1s orbital is defined as the release agent exposure rate. XPS is performed using JPS-9000MX manufactured by JEOL Ltd. as an analyzer and MgKα radiation as an X-ray source, at an acceleration voltage set to 10 kV and an emission current set to 30 mA.

Other Additives

Examples of other additives include known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v and a cumulative number-average particle size D50p. The particle size at which the cumulative percentage of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (circular equivalent perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

Silica Particles (S1)

The amount of the silica particles (S1) added to the exterior of the toner particles with respect to 100 parts by mass of the toner particles is, for example, preferably 0.1 parts by mass or more and 5.0 parts by mass or less, more preferably 0.42 parts by mass or more and 2.16 parts by mass or less, and even more preferably 0.5 parts by mass or more and 0.9 parts by mass or less.

A mass-based ratio M1/M2 of a content M1 of the silica particles (S1) contained in the toner to a content M2 of the silica particles (S2) contained in the toner is, for example, preferably 0.2 or more and 5.0 or less, more preferably 0.3 or more and 2.0 or less, and even more preferably 0.4 or more and 1.0 or less.

In a case where the ratio M1/M2 is 0.2 or more, the amount of the silica particles (S1) is appropriate with respect to the silica particles (S2), the anchoring effect of the silica particles (S1) is exerted, and uneven distribution of the adjacent silica particles (S2) is effectively suppressed. In addition, shearing of the toner is suppressed, burial of the external additives is effectively prevented as appropriate, and the fluidity of the toner is maintained.

In a case where the ratio M1/M2 is 5.0 or less, the amount of the silica particles (S2) is appropriate with respect to the silica particles (S1), and appropriate amounts of silica particles (S2) which have a relatively low circularity and are unlikely to roll are between the silica particles (S1). Accordingly, uneven distribution of the silica particles (S1) is suppressed, and the toner is inhibited from being aggregated in a high-temperature and high-humidity environment.

Examples of an exemplary embodiment of the silica particles (S1) include silica particles in which at least a part of the surface of silica base particles is coated with a reaction product of a silane coupling agent, and a nitrogen element-containing compound has adhered to the coating structure of the reaction product. In the present exemplary embodiment, a hydrophobic structure (a structure obtained by treating silica particles with a hydrophobic agent) may additionally adhere to the coating structure of the reaction product. The silane coupling agent is, for example, preferably at least one kind of silane coupling agent selected from the group consisting of a monofunctional silane coupling agent, a bifunctional silane coupling agent, and a trifunctional silane coupling agent, and more preferably a trifunctional silane coupling agent.

Examples of preferred exemplary embodiments of the silica particles (S1), for example, include silica particles having a coating structure that consists of a reaction product of a trifunctional silane coupling agent and a nitrogen element-containing compound that has adhered to the coating structure. The structure consisting of a reaction product of a trifunctional silane coupling agent has a pore structure. The nitrogen element-containing compound enters deeply into the pores, which makes the silica particles (S1) have a relatively high content of the nitrogen element-containing compound.

Silica Base Particles

The silica base particles may be dry silica or wet silica.

Examples of the dry silica include silica by a combustion method (fumed silica) obtained by combustion of a silane compound and silica by a deflagration method obtained by explosive combustion of metallic silicon powder.

Examples of the wet silica include wet silica obtained by a neutralization reaction between sodium silicate and a mineral acid (silica by a precipitation method synthesized·aggregated under alkaline conditions, silica by a gelation method synthesized·aggregated under acidic conditions), colloidal silica obtained by alkalifying and polymerizing acidic silicate, and sol-gel silica obtained by the hydrolysis of an organic silane compound (for example, alkoxysilane). As the silica base particles, from the viewpoint of charge distribution narrowing, for example, sol-gel silica is preferable.

Reaction Product of Silane Coupling Agent

The structure consisting of a reaction product of a silane coupling agent (particularly, a reaction product of a trifunctional silane coupling agent) has a pore structure. The nitrogen element-containing compound enters deeply into the pores, which makes the silica particles (S1) have a relatively high content of the nitrogen element-containing compound.

The silane coupling agent is, for example, preferably a compound that does not contain N (nitrogen element). Examples of the silane coupling agent include a silane coupling agent represented by Formula (TA).

$$R^1_n\text{—Si}(OR^2)_{4-n} \qquad \text{Formula (TA)}$$

In Formula (TA), $R^1$ represents a saturated or unsaturated aliphatic hydrocarbon group having 1 or more and 20 or less carbon atoms or an aromatic hydrocarbon group having 6 or more and 20 or less carbon atoms, $R^2$ represents a halogen atom or an alkoxy group, and n is 1, 2, or 3. In a case where n is 2 or 3, a plurality of $R^1$'s may be the same group or different groups. In a case where n is 1 or 2, a plurality of $R^2$'s may be the same group or different groups.

Examples of the reaction product of a silane coupling agent include a reaction product represented by Formula (TA) in which some or all of $OR^2$ are substituted with a OH group; a reaction product represented by Formula (TA) in which some or all of the groups formed by the substitution of $OR^2$ with a OH group are polycondensed; and a reaction product represented by Formula (TA) in which some or all of the groups formed by the substitution of $OR^2$ are polycondensed with a OH group and a SiOH group of the silica base particles.

The aliphatic hydrocarbon group represented by $R^1$ in Formula (TA) may be linear, branched, or cyclic. The aliphatic hydrocarbon group is, for example, preferably linear or branched. The aliphatic hydrocarbon group has, for example, preferably 1 or more and 20 or less carbon atoms, more preferably 1 or more and 18 or less carbon atoms, even more preferably 1 or more and 12 or less carbon atoms, and still more preferably 1 or more and 10 or less carbon atoms. The aliphatic hydrocarbon group may be saturated or unsaturated. The aliphatic hydrocarbon group is, for example, preferably a saturated aliphatic hydrocarbon group, and more preferably an alkyl group. The hydrogen atom of the aliphatic hydrocarbon group may be substituted with a halogen atom.

Examples of the saturated aliphatic hydrocarbon group include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, or an eicosyl group), a branched alkyl group (such as an isopropyl group, an isobutyl group, an isopentyl group, a neopentyl group, a 2-ethylhexyl group, a tertiary butyl group, a tertiary pentyl group, or an isopentadecyl group), a cyclic alkyl group (such as a cyclopropyl group, a cyclopentyl group, a cyclohexyl group, a cycloheptyl group, a cyclooctyl group, a tricyclodecyl group, a norbornyl group, or an adamantyl group), and the like.

Examples of the unsaturated aliphatic hydrocarbon group include an alkenyl group (such as a vinyl group (ethenyl group), a 1-propenyl group, a 2-propenyl group, a 2-butenyl group, a 1-butenyl group, a 1-hexenyl group, a 2-dodecenyl group, or a pentenyl group), an alkynyl group (such as an ethynyl group, a 1-propynyl group, a 2-propynyl group, a 1-butynyl group, a 3-hexynyl group, or a 2-dodecynyl group), and the like.

The number of carbon atoms in the aliphatic hydrocarbon group represented by $R^1$ in Formula (TA) is, for example, preferably 6 or more and 20 or less, more preferably 6 or more and 18 or less, even more preferably 6 or more and 12 or less, and still more preferably 6 or more and 10 or less. Examples of the aromatic hydrocarbon group include a phenylene group, a biphenylene group, a terphenylene group, a naphthalene group, an anthracene group, and the like. The hydrogen atom of the aromatic hydrocarbon group may be substituted with a halogen atom.

Examples of the halogen atom represented by $R^2$ in Formula (TA) include a fluorine atom, a chlorine atom, a bromine atom, an iodine atom, and the like. Among these, for example, a chlorine atom, a bromine atom, or an iodine atom is preferable.

As the alkyl group represented by $R^2$ in Formula (TA), for example, an alkyl group having 1 or more and 10 or less carbon atoms is preferable, an alkyl group having 1 or more and 8 or less carbon atoms is more preferable, and an alkyl group having 1 or more and 4 or less carbon atoms is even more preferable. Examples of the linear alkyl group having 1 or more and 10 or less carbon atoms include a methyl group, an ethyl group, a n-propyl group, a n-butyl group, a n-pentyl group, a n-hexyl group, a n-heptyl group, a n-octyl group, a n-nonyl group, and a n-decyl group. Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, and the like. Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and a polycyclic (for example, bicyclic, tricyclic, or spirocyclic) alkyl group composed of these monocyclic alkyl groups linked to each other. The hydrogen atom of the alkyl group may be substituted with a halogen atom.

n in Formula (TA) is 1, 2, or 3. For example, n is preferably 1 or 2, and more preferably 1.

The silane coupling agent represented by Formula (TA) is, for example, preferably a trifunctional silane coupling agent in which $R^1$ represents a saturated aliphatic hydrocarbon group having 1 or more and 20 or less carbon atoms, $R^2$ represents a halogen atom or an alkyl group having 1 or more and 10 or less carbon atoms, and n is 1.

Examples of the trifunctional silane coupling agent include vinyltrimethoxysilane, vinyltriethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, phenyltrichlorosilane (all of these compounds are compounds represented by Formula (TA) in which $R^1$ is an unsubstituted aliphatic hydrocarbon group or an unsubstituted aromatic hydrocarbon group); 3-glycidoxypropyltrimethoxysilane, γ-methacryloxypropyltrimethoxysilane, γ-mercaptopropyltrimethoxysilane, γ-chloropropyltrimethoxysilane, γ-glycidyloxypropylmethyldimethoxysilane (all of these compounds are compounds represented by Formula (TA) in which $R^1$ is a substituted aliphatic hydrocarbon group or a substituted aromatic hydrocarbon group); and the like. One kind of trifunctional silane coupling agent may be used alone, or two or more kinds of trifunctional silane coupling agents may be used in combination.

As the trifunctional silane coupling agent, for example, alkyltrialkoxysilane is preferable, and alkyltrialkoxysilane represented by Formula (TA) is more preferable in which $R^1$ represents an alkyl group having 1 or more and 20 or less (for example, preferably 1 or more and 15 or less) carbon atoms and $R^2$ represents an alkyl group having 1 or more and 2 or less carbon atoms.

The amount of the coating structure composed of the reaction product of a silane coupling agent with respect to the total amount of the silica particles (S1) is, for example, preferably 5.5% by mass or more and 30% by mass or less, and more preferably 7% by mass or more and 22% by mass or less.

Examples of exemplary embodiments of the nitrogen element-containing compound include a nitrogen element-containing compound containing a molybdenum element (hereinafter, called “molybdenum nitrogen-containing compound”) and a nitrogen element-containing compound that does not contain a molybdenum element.

Molybdenum Nitrogen-Containing Compound

The molybdenum nitrogen-containing compound is a nitrogen element-containing compound containing a molybdenum element, excluding ammonia and a compound that is in a gaseous state at a temperature of 25° C. or lower.

It is preferable that the molybdenum nitrogen-containing compound adhere, for example, to the pores of the reaction product of a silane coupling agent. One kind of molybdenum nitrogen-containing compound or two or more kinds of molybdenum nitrogen-containing compounds may be used.

From the viewpoint of charge distribution narrowing and charge distribution retentivity, the molybdenum nitrogen-containing compound is, for example, preferably at least one kind of compound selected from the group consisting of a quaternary ammonium salt containing a molybdenum element (particularly, a quaternary ammonium salt of molybdic acid) and a mixture of a quaternary ammonium salt and a metal oxide containing a molybdenum element. In the quaternary ammonium salt containing a molybdenum element, the bond between an anion containing a molybdenum element and a quaternary ammonium cation is strong. Therefore, the quaternary ammonium salt containing a molybdenum element has high charge distribution retentivity.

As the molybdenum nitrogen-containing compound, for example, a compound represented by Formula (1) is preferable.

Formula (1)

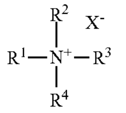

In Formula (1), $R^1$, $R^2$, $R^3$, and $R^4$ each independently represent a hydrogen atom, an alkyl group, an aralkyl group, or an aryl group, and $X^-$ represents an anion containing a molybdenum element. Here, at least one of $R^1$, $R^2$, $R^3$, or $R^4$ represents an alkyl group, an aralkyl group, or an aryl group. Furthermore, two or more out of $R^1$, $R^2$, $R^3$, and $R^4$ may be linked to form an aliphatic ring, an aromatic ring, or a heterocycle. The alkyl group, the aralkyl group, and the aryl group may have a substituent.

Examples of the alkyl group represented by $R^1$ to $R^4$ include a linear alkyl group having 1 or more and 20 or less carbon atoms and a branched alkyl group having 3 or more and 20 or less carbon atoms. Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, and the like. Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, and the like.

As the alkyl group represented by $R^1$ to $R^4$, for example, an alkyl group having 1 or more and 15 or less carbon atoms, such as a methyl group, an ethyl group, a butyl group, or a tetradecyl group, is preferable.

Examples of the aralkyl group represented by $R^1$ to $R^4$ include an aralkyl group having 7 or more and 30 or less carbon atoms. Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, a phenyl-cyclopentylmethyl group, and the like.

As the aralkyl group represented by $R^1$ to $R^4$, for example, an aralkyl group having 7 or more and 15 or less carbon atoms, such as a benzyl group, a phenylethyl group, a phenylpropyl group, or a 4-phenylbutyl group, is preferable.

Examples of the aryl group represented by $R^1$ to $R^4$ include an aryl group having 6 or more and 20 or less carbon atoms. Examples of the aryl group having 6 to 20 carbon atoms include a phenyl group, a pyridyl group, a naphthyl group, and the like.

As the aryl group represented by $R^1$ to $R^4$, for example, an aryl group having 6 or more and 10 or less carbon atoms, such as a phenyl group, is preferable.

Examples of the ring formed of two or more of $R^1$, $R^2$, $R^3$, and $R^4$ linked to each other include an alicyclic ring having 2 or more and 20 or less carbon atoms, a heterocyclic amine having 2 or more and 20 or less carbon atoms, and the like.

$R^1$, $R^2$, $R^3$, and $R^4$ may each independently have a substituent. Examples of the substituent include a nitrile group, a carbonyl group, an ether group, an amide group, a siloxane group, a silyl group, an alkoxysilane group, and the like.

It is preferable that $R^1$, $R^2$, $R^3$, and $R^4$ each independently represent, for example, an alkyl group having 1 or more and 16 or less carbon atoms, an aralkyl group having 7 or more and 10 or less carbon atoms, or an aryl group having 6 or more and 20 or less carbon atoms.

The anion containing a molybdenum element represented by $X^-$ is, for example, preferably a molybdate ion, more preferably a molybdate ion having tetravalent or hexavalent molybdenum, and even more preferably a molybdate ion having hexavalent molybdenum. Specifically, as the molybdate ion, for example, $MoO_4^{2-}$, $Mo_2O_7^{2-}$, $Mo_3O_{10}^{2-}$, $Mo_4O_{13}^{2-}$, $Mo_7O_{24}^{2-}$, and $Mo_8O_{26}^{4-}$ are preferable.

From the viewpoint of charge distribution narrowing and charge distribution retentivity, the total number of carbon atoms in the compound represented by Formula (1) is, for example, preferably 18 or more and 35 or less, and more preferably 20 or more and 32 or less.

Examples of the compound represented by Formula (1) will be shown below. The present exemplary embodiment is not limited thereto.

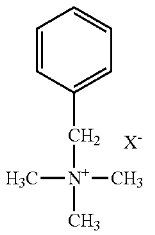

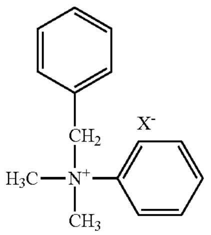

-continued

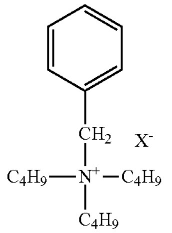

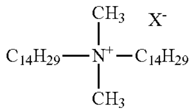

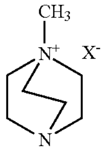

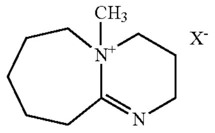

Examples of the quaternary ammonium salt containing a molybdenum element include a quaternary ammonium salt of molybdic acid such as $[N^+(CH)_3(C_{14}C_{29})_2]_4Mo_8O_{28}^{4-}$, $[N^+(C_4H_9)_2(C_6H_6)_2]_2Mo_2O_7^{2-}$, $[N^+(CH_3)_2(CH_2C_6H_6)(CH_2)_{17}CH_3]_2MoO_4^{2-}$, and $[N^+(CH_3)_2(CH_2C_6H_6)(CH_2)_{15}CH_3]_2MoO_4^{2-}$.

Examples of the metal oxide containing a molybdenum element include a molybdenum oxide (molybdenum trioxide, molybdenum dioxide, or $Mo_9O_{26}$), a molybdic acid alkali metal salt (such as lithium molybdate, sodium molybdate, or potassium molybdate), a molybdenum alkaline earth metal salt (such as magnesium molybdate or calcium molybdate) and other composite oxides (such as $Bi_2O_3 \cdot 2MoO_3$ or $\gamma$-$Ce_2Mo_3O_{13}$).

In a case where the silica particles (S1) contain a molybdenum nitrogen-containing compound, the molybdenum nitrogen-containing compound is detected in a case where the silica particles (S1) are heated in a temperature range of 300° C. or higher and 600° C. or lower. The molybdenum nitrogen-containing compound can be detected by heating at a temperature of 300° C. or higher and 600° C. or lower in an inert gas. For example, the molybdenum nitrogen-containing compound is detected using a heating furnace-type drop-type pyrolysis gas chromatography mass spectrometer using He as a carrier gas. Specifically, by introducing silica particles in an amount of 0.1 mg or more and 10 mg or less into a pyrolysis gas chromatograph mass spectrometer, it is possible to check whether or not the silica particles contain a molybdenum nitrogen-containing compound from the MS spectrum of the detected peak. Examples of components generated by pyrolysis from the silica particles containing a molybdenum nitrogen-containing compound include a primary, secondary, or tertiary amine represented by Formula (2) and an aromatic nitrogen compound. $R^1$, $R^2$, and $R^3$ in Formula (2) have the same definition as $R^1$, $R^2$, and $R^3$ in Formula (1) respectively. In a case where the molybdenum nitrogen-containing compound is a quaternary ammonium salt, some of the side chains thereof are detached by pyrolysis at 600° C., and a tertiary amine is detected.

Formula (2)

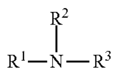

In a case where the silica particles (S1) contain a molybdenum nitrogen-containing compound, a ratio $N_{Mo}/N_{Si}$ of Net intensity $N_{Mo}$ of the molybdenum element and Net intensity $N_{Si}$ of the silicon element measured by X-ray fluorescence analysis is, for example, preferably 0.035 or more and 0.35 or less, more preferably 0.05 or more and 0.30 or less, even more preferably 0.07 or more and 0.20 or less, and still more preferably 0.10 or more and 0.15 or less.

In a case where the silica particles (S1) contain a molybdenum nitrogen-containing compound, from the viewpoint of charge distribution narrowing and charge distribution retentivity, the Net intensity $N_{Mo}$ of the molybdenum element in the silica particles (S1) is, for example, preferably 5 kcps or more and 75 kcps or less, more preferably 7 kcps or more and 55 kcps or less, even more preferably 8 kcps or more and 50 kcps or less, and still more preferably 10 kcps or more and 40 kcps or less.

The method of measuring the Net intensity $N_{Mo}$ of the molybdenum element and the Net intensity $N_{Si}$ of the silicon element in the silica particles is as follows.

Approximately 0.5 g of silica particles are compressed using a compression molding machine by being pressed under a load of 6 tons for 60 seconds, thereby preparing a disk having a diameter of 50 mm and a thickness of 2 mm. This disk is used as a sample for qualitative quantitative elemental analysis performed under the following conditions by using a scanning X-ray fluorescence spectrometer (XRF-1500, manufactured by Shimadzu Corporation), and Net intensity of each of the molybdenum element and the silicon element is determined (unit: kilo counts per second, kcps).

Tube voltage: 40 kV
Tube current: 90 mA
Measurement area (analysis diameter): diameter of 10 mm
Measurement time: 30 minutes
Anti cathode: rhodium Nitrogen Element-Containing Compound that does not Contain Molybdenum Element Examples of the nitrogen element-containing compound that does not contain a molybdenum element include at least one kind of compound selected from the group consisting of a quaternary ammonium salt, a primary amine compound, a secondary amine compound, a tertiary amine compound, an amide compound, an imine compound, and a nitrile compound. The nitrogen element-containing compound that does not contain a molybdenum element is, for example, preferably a quaternary ammonium salt.

Specific examples of the primary amine compound include phenethylamine, toluidine, catecholamine, and 2,4,6-trimethylaniline.

Specific examples of the secondary amine compound include dibenzylamine, 2-nitrodiphenylamine, and 4-(2-octylamino)diphenylamine.

Specific examples of the tertiary amine compound include 1,8-bis(dimethylamino)naphthalene, N,N-dibenzyl-2-aminoethanol, and N-benzyl-N-methylethanolamine.

Specific examples of the amide compound include N-cyclohexyl-p-toluenesulfonamide, 4-acetamide-1-benzylpiperidine, and N-hydroxy-3-[1-(phenylthio)methyl-1H-1,2,3-triazol-4-yl]benzamide.

Specific examples of the imine compound include diphenylmethaneimine, 2,3-bis(2,6-diisopropylphenylimino)butane, and N,N'-(ethane-1,2-diylidene)bis(2,4,6-trimethylaniline).

Specific examples of the nitrile compound include 3-indoleacetonitrile, 4-[(4-chloro-2-pyrimidinyl)amino]benzonitrile, and 4-bromo-2,2-diphenylbutyronitrile.

Examples of the quaternary ammonium salt include a compound represented by Formula (AM). One kind of compound represented by Formula (AM) or two or more kinds of compounds represented by Formula (AM) may be used.

Formula (AM)

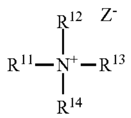

In Formula (AM), $R^{11}$, $R^{12}$, $R^{13}$, and $R^{14}$ each independently represent a hydrogen atom, an alkyl group, an aralkyl group, or an aryl group, and $Z^-$ represents an anion. Here, at least one of $R^{11}$, $R^{12}$, $R^{13}$, or $R^{14}$ represents an alkyl group, an aralkyl group, or an aryl group. Furthermore, two or more out of $R^{11}$, $R^{12}$, $R^{13}$, and $R^{14}$ may be linked to form an aliphatic ring, an aromatic ring, or a heterocycle. The alkyl group, the aralkyl group, and the aryl group may have a substituent.

Examples of the alkyl group represented by $R^{11}$ to $R^{14}$ include a linear alkyl group having 1 or more and 20 or less carbon atoms and a branched alkyl group having 3 or more and 20 or less carbon atoms. Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, and the like. Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, and the like.

As the alkyl group represented by $R^{11}$ to $R^{14}$, for example, an alkyl group having 1 or more and 15 or less carbon atoms, such as a methyl group, an ethyl group, a butyl group, or a tetradecyl group, is preferable.

Examples of the aralkyl group represented by $R^{11}$ to $R^{14}$ include an aralkyl group having 7 or more and 30 or less carbon atoms. Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, a phenyl-cyclopentylmethyl group, and the like.

As the aralkyl group represented by $R^{11}$ to $R^{14}$, for example, an aralkyl group having 7 or more and 15 or less carbon atoms, such as a benzyl group, a phenylethyl group, a phenylpropyl group, or a 4-phenylbutyl group, is preferable.

Examples of the aryl group represented by $R^{11}$ to $R^{14}$ include an aryl group having 6 or more and 20 or less carbon atoms. Examples of the aryl group having 6 to 20 carbon atoms include a phenyl group, a pyridyl group, a naphthyl group, and the like.

As the aryl group represented by $R^{11}$ to $R^{14}$, for example, an aryl group having 6 or more and 10 or less carbon atoms, such as a phenyl group, is preferable.

Examples of the ring formed of two or more of $R^{11}$, $R^{12}$, $R^{13}$, and $R^{14}$ linked to each other include an alicyclic ring having 2 or more and 20 or less carbon atoms, a heterocyclic amine having 2 or more and 20 or less carbon atoms, and the like.

$R^{11}$, $R^{12}$, $R^{13}$, and $R^{14}$ may each independently have a substituent. Examples of the substituent include a nitrile group, a carbonyl group, an ether group, an amide group, a siloxane group, a silyl group, an alkoxysilane group, and the like.

It is preferable that $R^{11}$, $R^{12}$, $R^{13}$, and $R^{14}$ each independently represent, for example, an alkyl group having 1 or more and 16 or less carbon atoms, an aralkyl group having 7 or more and 10 or less carbon atoms, or an aryl group having 6 or more and 20 or less carbon atoms.

The anion represented by $Z^-$ may be any of an organic anion and an inorganic anion.

Examples of the organic anion include a polyfluoroalkylsulfonate ion, a polyfluoroalkylcarboxylate ion, a tetraphenylborate ion, an aromatic carboxylate ion, an aromatic sulfonate ion (such as a 1-naphthol-4-sulfonate ion), and the like.

Examples of the inorganic anion include $OH^-$, $F^-$, $Fe(CN)_6^{3-}$, $Cl^-$, $Br^-$, $NO_2^-$, $NO_3^-$, $CO_3^{2-}$, $PO_4^{3-}$, $SO_4^{2-}$, and the like.

From the viewpoint of charge distribution narrowing and charge distribution retentivity, the total number of carbon atoms in the compound represented by Formula (AM) is, for example, preferably 18 or more and 35 or less, and more preferably 20 or more and 32 or less.

Examples of the compound represented by Formula (AM) will be shown below. The present exemplary embodiment is not limited thereto.

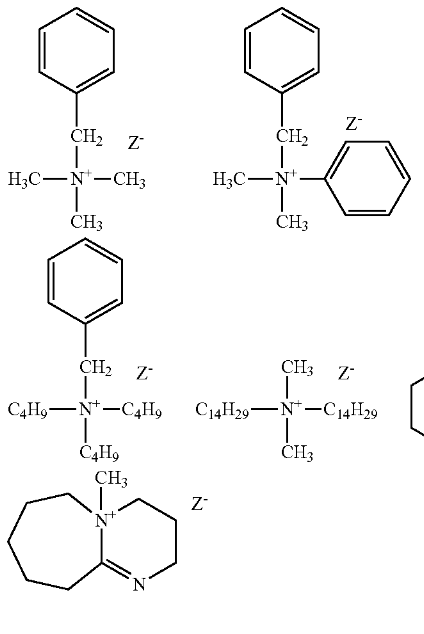

From the viewpoint of charge distribution narrowing and charge distribution retentivity, the total content of the molybdenum nitrogen-containing compound and the nitrogen element-containing compound that does not contain a molybdenum element, which are contained in the silica particles (S1), the total content being expressed as a mass ratio N/Si of a nitrogen element to a silicon element, is, for example, preferably 0.005 or more and 0.50 or less, more preferably 0.008 or more and 0.45 or less, even more preferably 0.015 or more and 0.20 or less, and still more preferably 0.018 or more and 0.10 or less.

The mass ratio N/Si in the silica particles (S1) is measured using an oxygen·nitrogen analyzer (for example, EMGA-920 manufactured by HORIBA, Ltd.) for a total of 45 seconds, and determined as a mass ratio of N atoms to Si atoms (N/Si). As a pretreatment, the sample is dried in a vacuum at 100° C. for 24 hours or more to remove impurities such as ammonia.

A total extraction amount X of the molybdenum nitrogen-containing compound and the nitrogen element-containing compound that does not contain a molybdenum element, which are extracted from the silica particles (S1) by using a mixed solution of ammonia/methanol, is, for example, preferably 0.1% by mass or more. In addition, the total extraction amount X of the molybdenum nitrogen-containing compound and the nitrogen element-containing compound that does not contain a molybdenum element, which are extracted from the silica particles (S1) by the mixed solution of ammonia/methanol, and a total extraction amount Y of the molybdenum nitrogen-containing compound and the nitrogen element-containing compound that does not contain a molybdenum element, which are extracted from the silica particles (S1) by water preferably satisfy, for example, $Y/X<0.3$.

The above relationship shows that the nitrogen element-containing compound contained in the silica particles (S1) has the properties of not being easily dissolved in water, that is, the properties of not being easily adsorbed onto the moisture in the air. Therefore, in a case where the above relationship is satisfied, the silica particles (S1) are excellent in charge distribution narrowing and charge distribution retentivity.

The extraction amount X is, for example, preferably 50% by mass or more. The upper limit of the extraction amount X is, for example, 95% by mass or less. Ideally, the ratio Y/X of the extraction amount Y to the extraction amount X is 0.

The extraction amount X and the extraction amount Y are measured by the following method.

First, the silica particles are analyzed with a thermogravimetric analyzer (for example, a gas chromatograph mass spectrometer manufactured by Netch Japan Co., Ltd.) at a temperature of 400° C., the mass fractions of compounds in which a hydrocarbon having one or more carbon atoms forms a covalent bond with a nitrogen atom to the silica particles are measured, added up, and adopted as W1.

The silica particles (1 part by mass) are added to 30 parts by mass of an ammonia/methanol solution (manufactured by Sigma-Aldrich Co., LLC., mass ratio of ammonia/methanol=1/5.2) at a liquid temperature of 25° C. and treated with ultrasonic waves for 30 minutes, and then silica powder and an extract are separated. The separated silica particles are dried in a vacuum dryer at 100° C. for 24 hours. Then, by using a thermogravimetric analyzer, the mass fractions of compounds in which a hydrocarbon having one or more carbon atoms forms a covalent bond with a nitrogen atom to the silica particles are measured at 400° C., added up, and adopted as W2.

The silica particles (1 part by mass) are added to 30 parts by mass of water at a liquid temperature of 25° C. and treated with ultrasonic waves for 30 minutes, and then the silica particles and an extract are separated. The separated silica particles are dried in a vacuum dryer at 100° C. for 24 hours. Then, by using a thermogravimetric analyzer, the mass fractions of compounds in which a hydrocarbon having one or more carbon atoms forms a covalent bond with a nitrogen atom to the silica particles are measured at 400° C., added up, and adopted as W3.

From W1 and W2, extraction amount X=W1−W2 is calculated.

From W1 and W3, extraction amount Y=W1−W3 is calculated.

Hydrophobic Structure

In the silica particles (S1), a hydrophobic structure (a structure obtained by treating silica particles with a hydrophobic agent) may adhere to the coating structure of the reaction product of a silane coupling agent.

As the hydrophobic agent, for example, an organosilicon compound is used. Examples of the organosilicon compound include the following compounds.

An alkoxysilane compound or a halosilane compound having a lower alkyl group, such as methyltrimethoxysilane, dimethyldimethoxysilane, trimethylchlorosilane, or trimethylmethoxysilane.

An alkoxysilane compound having a vinyl group, such as vinyltrimethoxysilane or vinyltriethoxysilane.

An alkoxysilane compound having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, or 3-glycidoxypropyltriethoxysilane.

An alkoxysilane compound having a styryl group, such as p-styryltrimethoxysilane or p-styryltriethoxysilane.

An alkoxysilane compound having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, or N-phenyl-3-aminopropyltrimethoxysilane.

An alkoxysilane compound having an isocyanate alkyl group, such as 3-isocyanatepropyltrimethoxysilane or 3-isocyanatepropyltriethoxysilane.

A silazane compounds such as hexamethyldisilazane or tetramethyldisilazane.

From the viewpoint of charge distribution narrowing and charge distribution retentivity, the silica particles (S1) preferably have, for example, the following characteristics.

Number-Based Particle Size Distribution Index

The number-based particle size distribution index of the silica particles (S1) is, for example, preferably 1.1 or more and 2.0 or less, and more preferably 1.15 or more and 1.6 or less. In a case where a particle size below which a cumulative percentage of particles having a smaller particle size is 16% in an equivalent circular diameter distribution is defined as D16, and a particle size below which a cumulative percentage of particles having a smaller particle size is 84% in an equivalent circular diameter distribution is defined as D84, the number-based particle size distribution index is a value defined as number-based particle size distribution index=$(D84/D16)^{0.5}$.

Degree of Hydrophobicity

A degree of hydrophobicity of the silica particles (S1) is, for example, preferably 10% or more and 60% or less, more preferably 20% or more and 55% or less, even more preferably 26% or more and 53% or less, and still more preferably 28% or more and 49% or less.

The silica particles (S1) having a degree of hydrophobicity of 10% or more tell that the surface of the silica base particles is appropriately coated with the coating structure showing hydrophobicity (an example of exemplary embodiments include a coating structure consisting of a reaction product of a trifunctional silane coupling agent). In this case, the content of the nitrogen element-containing compound that adheres to the coating structure and is contained in the silica particles (S1) is appropriate, which enables the silica particles (S1) to exert an anchoring effect on the negatively charged toner particles.

The silica particles (S1) having a degree of hydrophobicity of 60% or less tell that the coating structure showing hydrophobicity present on the surface of the silica base particles (an example of exemplary embodiments is a coating structure consisting of a reaction product of a trifunctional silane coupling agent) is not too dense. In this case, the nitrogen element-containing compound enters and adheres to the pores of the coating structure, and a sufficient amount of the nitrogen element-containing compound is incorporated into the silica particles (S1), which enables the silica particles (S1) to exert an anchoring effect on the negatively charged toner particles.

The method of measuring the degree of hydrophobicity of the silica particles is as follows.

Silica particles (0.2% by mass) are added to 50 ml of deionized water. While the mixture is being stirred with a magnetic stirrer, methanol is added dropwise thereto from a burette, and the mass fraction of methanol in the mixed solution of methanol/water at a point in time when the entirety of the sample is precipitated is determined and adopted as a degree of hydrophobicity.

Volume Resistivity

A volume resistivity R of the silica particles (S1) is, for example, preferably $1.0\times10^{8}$ Ω·cm or more and $1.0\times10^{12.5}$ Ω·cm or less, more preferably $1.0\times10^{8}$ Ω·cm or more and $1.0\times10^{12}$ Ω·cm or less, even more preferably $1.0\times10^{8.5}$ Ω·cm or more and $1.0\times10^{11.5}$ Ω·cm or less, and still more preferably $1.0\times10^{9}$ Ω·cm or more and $1.0\times10^{11}$ Ω·cm or less.

In a case where the volume resistivity R of the silica particles (S1) is in the above range, the silica particles (S1) are inhibited from being excessively charged, and the silica particles (S1) exert an appropriate anchoring effect on the negatively charged toner particles. The volume resistivity R of the silica particles (S1) can be adjusted by the content of the nitrogen element-containing compound.

In a case where Ra represents a volume resistivity of the silica particles (S1) before baking at 350° C., and Rb represents a volume resistivity of the silica particles (S1) after baking at 350° C., a ratio Ra/Rb is, for example, preferably 0.01 or more and 0.8 or less, and more preferably 0.015 or more and 0.6 or less.

The volume resistivity Ra (having the same definition as the aforementioned volume resistivity R) of the silica particles (S1) before baking at 350° C. is, for example, preferably $1.0\times10^{8}$ Ω·cm or more and $1.0\times10^{12.5}$ Ω·cm or less, more preferably $1.0\times10^{8}$ Ω·cm or more and $1.0\times10^{12}$ Ω·cm or less, even more preferably $1.0\times10^{8.5}$ Ω·cm or more and $1.0\times10^{11.5}$ Ω·cm or less, and still more preferably $1.0\times10^{9}$ Ω·cm or more and $1.0\times10^{11}$ Ω·cm or less.

The baking at 350° C. is a process of heating the silica particles (A) up to 350° C. at a heating rate of 10° C./min in a nitrogen environment, keeping the silica particles (A) at 350° C. for 3 hours, and cooling the silica particles (A) to room temperature (25° C.) at a cooling rate of 10° C./min.

The volume resistivity of the silica particles (S1) is measured as follows in an environment at a temperature of 20° C. and a relative humidity of 50%.

The silica particles (S1) are placed on the surface of a circular jig on which a 20 $cm^2$ electrode plate is disposed, such that a silica particle layer having a thickness of about 1 mm or more and 3 mm or less is formed. A 20 $cm^2$ electrode plate is placed on the silica particle layer such that the silica particle layer is interposed between the electrode plates, and in order to eliminate voids between the silica particles, a pressure of 0.4 MPa is applied on the electrode plate. A thickness L (cm) of the silica particle layer is measured. By using an impedance analyzer (manufactured by Solartron Analytical) connected to both the electrodes placed on and under the silica particle layer, a Nyquist plot in a frequency range of $10^{-3}$ Hz or more and $10^6$ Hz or less is obtained. On the assumption that there are three resistance components, bulk resistance, particle interface resistance, and electrode contact resistance, the plot is fitted to an equivalent circuit, and a bulk resistance R (Ω) is determined. From the bulk resistance R (Ω) and the thickness L (cm) of the silica particle layer, a volume resistivity p (Ω·cm) of the silica particles is calculated by the equation of ρ=R/L.

Amount of OH Groups

The amount of OH groups in the silica particles (S1) is, for example, preferably 0.05 OH groups/$nm^2$ or more and 6 OH groups/$nm^2$ or less, more preferably 0.1 OH groups/$nm^2$ or more and 5.5 OH groups/$nm^2$ or less, even more preferably 0.15 OH groups/$nm^2$ or more and 5 OH groups/$nm^2$ or less, still more preferably 0.2 OH groups/$nm^2$ or more and 4 OH groups/$nm^2$ or less, and yet more preferably 0.2 OH groups/$nm^2$ or more and 3 OH groups/$nm^2$ or less.

The amount of OH groups in the silica particles is measured as follows by the Sears method.

Silica particles (1.5 g) are added to a mixed solution of 50 g of water/50 g of ethanol, and the mixture is stirred with an ultrasonic homogenizer for 2 minutes, thereby preparing a dispersion. While the dispersion is being stirred in an environment at 25° C., 1.0 g of a 0.1 mol/L aqueous hydrochloric acid solution is added dropwise thereto, thereby obtaining a test liquid. The test liquid is put in an automatic titration device, potentiometric titration using a 0.01 mol/L aqueous sodium hydroxide solution is performed, and a differential curve of the titration curve is created. In the inflection point where the differential value of the titration curve is 1.8 or more, the titration amount by which the titration amount of the 0.01 mol/L aqueous sodium hydroxide solution is maximized is denoted by E.

From the following equation, a surface silanol group density p (number of surface silanol groups/$nm^2$) in the silica particles is calculated and adopted as the amount of OH groups in the silica particles.

$$\rho=((0.01\times E-0.1)\times NA/1{,}000)/(m\times S_{BET}\times 10^{18}) \quad \text{Equation}$$

E: titration amount by which the titration amount of the 0.01 mol/L aqueous sodium hydroxide solution is maximized in the inflection point where the differential value of the titration curve is 1.8 or more, NA: Avogadro's number, M: amount of silica particles (1.5 g), $S_{BET}$: specific surface area of silica particles ($m^2$/g) measured by the three-point BET nitrogen adsorption method (relative equilibrium pressure is 0.3).

Pore Diameter

For example, in a pore size distribution curve obtained by a nitrogen adsorption method, the silica particles (S1) preferably have a first peak in a range of pore diameter of 0.01 nm or more and 2 nm or less and a second peak in a range of pore diameter of 1.5 nm or more and 50 nm or less, more preferably have a second peak in a range of pore diameter of 2 nm or more and 50 nm or less, even more preferably have a second peak in the range of pore diameter of 2 nm or more and 40 nm or less, and particularly preferably have a second peak in a range of pore diameter of 2 nm or more and 30 nm or less.

In a case where the first peak and the second peak are in the above range, the nitrogen element-containing compound enters deeply into the pores of the coating structure, and the charge distribution is narrowed.

The method of obtaining the pore size distribution curve by the nitrogen adsorption method is as follows.

The silica particles are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From the adsorption isotherm, a pore size distribution curve in which the ordinate shows a frequency and the abscissa shows a pore diameter is obtained by the equation of the BJH method. Then, from the obtained pore size distribution curve, an integrated pore volume distribution in which the ordinate shows a volume and the abscissa shows a pore diameter is obtained, and the position of peak of the pore diameter is checked.

From the viewpoint of charge distribution narrowing and charge distribution retentivity, the silica particles (S1) preferably satisfy, for example, any of the following aspects (A) and (B).

Aspect (A): an aspect in which in a case where A represents a pore volume of pores having a diameter of 1 nm or more and 50 nm or less determined from a pore size distribution curve obtained by a nitrogen adsorption method before baking at 350° C., and B represents a pore volume of pores having a diameter of 1 nm or more and 50 nm or less determined from a pore size distribution curve obtained by a nitrogen adsorption method after baking at 350° C., a ratio B/A is 1.2 or more and 5 or less, and B is 0.2 $cm^3$/g or more and 3 $cm^3$/g or less.

Hereinafter, "pore volume A of pores having a diameter of 1 nm or more and 50 nm or less determined from a pore size distribution curve obtained by a nitrogen adsorption method before baking at 350° C." will be called "pore volume A before baking at 350° C.", and "pore volume B of pores having a diameter of 1 nm or more and 50 nm or less determined from a pore size distribution curve obtained by a nitrogen adsorption method after baking at 350° C." will be called "pore volume B after baking at 350° C.".

The baking at 350° C. is a process of heating the silica particles (A) up to 350° C. at a heating rate of 10° C./min in a nitrogen environment, keeping the silica particles (A) at 350° C. for 3 hours, and cooling the silica particles (A) to room temperature (25° C.) at a cooling rate of 10° C./min.

The method of measuring the pore volume is as follows.

The silica particles are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From the adsorption isotherm, a pore size distribution curve in which the ordinate shows a frequency and the abscissa shows a pore diameter is obtained by the equation of the BJH method. From the obtained pore size distribution curve, an integrated pore volume distribution in which the ordinate shows a volume and the abscissa shows a pore diameter is obtained. From the obtained integrated pore volume distribution, an integral value of pore volumes of pores having a diameter in a range of 1 nm or more and 50 nm or less is calculated and adopted as "pore volume of pores having a diameter of 1 nm or more and 50 nm or less".

The ratio B/A of the pore volume B after baking at 350° C. to the pore volume A before baking at 350° C. is, for example, preferably 1.2 or more and 5 or less, more preferably 1.4 or more and 3 or less, and even more preferably 1.4 or more and 2.5 or less.

The pore volume B after baking at 350° C. is, for example, preferably 0.2 $cm^3/g$ or more and 3 $cm^3/g$ or less, more preferably 0.3 $cm^3/g$ or more and 1.8 $cm^3/g$ or less, and even more preferably 0.6 $cm^3/g$ or more and 1.5 $cm^3/g$ or less.

Aspect (B): an aspect in which in a case where C represents an integral value of signals observed in a range of chemical shift of −50 ppm or more and −75 ppm or less in a $^{29}Si$ solid-state nuclear magnetic resonance (NMR) spectrum obtained by a cross-polarization/magic angle spinning (CP/MAS) method (hereinafter, also called "Si-CP/MAS NMR spectrum"), and D represents an integral value of signals observed in a range of chemical shift of −90 ppm or more and −120 ppm or less in the same spectrum, a ratio C/D is 0.10 or more and 0.75 or less.

The Si-CP/MAS NMR spectrum can be obtained by measuring a sample by nuclear magnetic resonance spectroscopy under the following conditions.

Spectrometer: AVANCE 300 (manufactured by Bruker)
Resonance frequency: 59.6 MHz
Measurement nucleus: $^{29}Si$
Measurement method: CPMAS method (using Bruker's standard ParC sequence cp.av)
Waiting time: 4 sec
Contact time: 8 ms
Number of times of integration: 2,048
Measurement temperature: room temperature (25° C., measured temperature)
Center frequency of observation: −3975.72 Hz
MAS rotation speed: 7.0 mm-6 kHz
Reference substance: hexamethylcyclotrisiloxane The ratio C/D is, for example, preferably 0.10 or more and 0.75 or less, more preferably 0.12 or more and 0.45 or less, and even more preferably 0.15 or more and 0.40 or less.

In a case where the integral value of all signals in Si-CP/MAS NMR spectrum is regarded as 100%, the ratio of the integral value C (Signal ratio) of the signals observed in a range of chemical shift of −50 ppm or more and −75 ppm or less is, for example, preferably 5% or more, and more preferably 7% or more. The upper limit of the ratio of the integral value C of the signals is, for example, 60% or less.

Manufacturing Method of Silica Particles (S1)

An example of a manufacturing method of the silica particles (S1) has a first step of forming a coating structure consisting of a reaction product of a silane coupling agent on at least a part of a surface of silica base particles, and a second step of attaching a nitrogen element-containing compound to the coating structure. The present manufacturing method may further have a third step of performing a hydrophobic treatment on the silica base particles having the coating structure after the second step or during the second step. Hereinafter, the above steps will be specifically described.

Silica Base Particles

The silica base particles are prepared, for example, by the following step (i) or step (ii).

Step (i) a step of mixing an alcohol-containing solvent with silica base particles to prepare a silica base particle suspension.

Step (ii) a step of ting silica base particles by a sol-gel method to obtain a silica base particle suspension.

The silica base particles used in the step (i) may be dry silica or wet silica. Specific examples thereof include sol-gel silica, aqueous colloidal silica, alcoholic silica, fumed silica, molten silica, and the like.

The alcohol-containing solvent used in the step (i) may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, the proportion of the alcohol is, for example, preferably 80% by mass or more, and more preferably 85% by mass or more.

The step (ii) is, for example, preferably a sol-gel method including an alkali catalyst solution preparation step of preparing an alkali catalyst solution composed of an alcohol-containing solvent containing an alkali catalyst and a silica base particle generation step of supplying tetraalkoxysilane and an alkali catalyst to the alkali catalyst solution to generate silica base particles.

The alkali catalyst solution preparation step is, for example, preferably a step of preparing an alcohol-containing solvent and mixing the solvent with an alkali catalyst to obtain an alkali catalyst solution.

The alcohol-containing solvent may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, the proportion of the alcohol is, for example, preferably 80% by mass or more, and more preferably 85% by mass or more.

The alkali catalyst is a catalyst for accelerating the reaction of tetraalkoxysilane (a hydrolysis reaction and a condensation reaction). Examples thereof include basic catalysts such as ammonia, urea, and monoamine. Among these, for example, ammonia is particularly preferable.

The concentration of the alkali catalyst in the alkali catalyst solution is, for example, preferably 0.5 mol/L or more and 1.5 mol/L or less, more preferably 0.6 mol/L or more and 1.2 mol/L or less, and even more preferably 0.65 mol/L or more and 1.1 mol/L or less.

The silica base particle generation step is a step of supplying tetraalkoxysilane and an alkali catalyst to the alkali catalyst solution and reacting the tetraalkoxysilane (a hydrolysis reaction and condensation reaction) in the alkali catalyst solution to generate silica base particles.

In the silica base particle generation step, core particles are generated by the reaction of the tetraalkoxysilane at the early stage of supplying tetraalkoxysilane (core particle generation stage), and then silica base particles are generated through the growth of the core particles (core particle growth stage).

Examples of the tetraalkoxysilane include tetramethoxysilane, tetraethoxysilane, tetrapropoxysilane, tetrabutoxysilane, and the like. From the viewpoint of controlling the reaction rate or uniformity of the shape of the silica base particles to be generated, for example, tetramethoxysilane or tetraethoxysilane is preferable.

Examples of the alkali catalyst supplied to the alkali catalyst solution include basic catalysts such as ammonia, urea, and monoamine. Among these, for example, ammonia is particularly preferable. The alkali catalyst supplied together with the tetraalkoxysilane may be of the same type as or different type from the alkali catalyst contained in the alkali catalyst solution in advance. For example, it is preferable that the alkali catalysts be of the same type.

The method for supplying the tetraalkoxysilane and the alkali catalyst to the alkali catalyst solution may be a continuous supply method or an intermittent supply method.

In the silica base particle generation step, the temperature of the alkali catalyst solution (temperature at the time of supply) is, for example, preferably 5° C. or higher and 50° C. or lower, and more preferably 15° C. or higher and 45° C. or lower.

First Step

The first step is, for example, a step of adding a silane coupling agent to the silica base particle suspension, and reacting the silane coupling agent on the surface of the silica base particles such that the coating structure consisting of a reaction product of the silane coupling agent is formed.

The reaction of the silane coupling agent is carried out, for example, by adding the silane coupling agent to the silica base particle suspension and then heating the suspension with stirring. Specifically, for example, the suspension is heated to a temperature of 40° C. or higher and 70° C. or lower, a silane coupling agent is added thereto, and then the mixture is stirred. The stirring is continued, for example, preferably for 10 minutes or more and 24 hours or less, more preferably for 60 minutes or more and 420 minutes or less, and even more preferably 80 minutes or more and 300 minutes or less.

Second Step

The second step is, for example, preferably a step of attaching a nitrogen element-containing compound to pores of the coating structure (that is, the pore structure) consisting of the reaction product of the silane coupling agent.

In the second step, for example, a nitrogen element-containing compound is added to a silica base particle suspension obtained after the reaction with a silane coupling agent, and the mixture is stirred at a liquid temperature kept at a temperature range of 20° C. or higher and 50° C. or lower. The nitrogen element-containing compound may be added to the silica particle suspension, as an alcohol solution containing the nitrogen element-containing compound. The alcohol may be of the same type as or different type from the alcohol contained in the silica base particle suspension. For example, it is preferable that the alcohols be of the same type. In the alcohol solution containing the nitrogen element-containing compound, for example, the concentration of the nitrogen element-containing compound is preferably 0.05% by mass or more and 10% by mass or less, and more preferably 0.1% by mass or more and 6% by mass or less.

Third Step

The third step is a step of additionally attaching a hydrophobic structure to the coating structure consisting of the reaction product of the silane coupling agent. The third step is a hydrophobic treatment step performed after the second step or during the second step. The functional groups of the hydrophobic agent react with one another and/or react with the OH groups of the silica base particles, thereby forming a hydrophobic layer.

In the third step, for example, a nitrogen element-containing compound is added to the silica base particle suspension obtained after the reaction with the silane coupling agent, and then the hydrophobic agent is added thereto. At this time, for example, it is preferable to stir and heat the suspension. For example, the suspension is heated to a temperature of 40° C. or higher and 70° C. or lower, a hydrophobic agent is added thereto, and then the mixture is stirred. The stirring is continued, for example, preferably for 10 minutes or more and 24 hours or less, more preferably for 20 minutes or more and 120 minutes or less, and even more preferably 20 minutes or more and 90 minutes or less.

Drying Step

For example, it is preferable to perform a drying step of removing solvents from the suspension after the second or third step is performed or while the second or third step is being performed. Examples of the drying method include heat drying, spray drying, and supercritical drying.

Spray drying can be performed by a conventionally known method using a spray dryer (such as a rotary disk spray dryer or a nozzle spray dryer). For example, in a hot air stream, the silica particle suspension is sprayed at a rate of 0.2 L/hour or more and 1 L/hour or less. The temperature of hot air is set such that, for example, the inlet temperature of the spray dryer is preferably in a range of 70° C. or higher and 400° C. or lower and the outlet temperature of the spray dryer is preferably in a range of 40° C. or higher and 120° C. or lower. The inlet temperature is, for example, more preferably in a range of 100° C. or higher and 300° C. or lower. The silica particle concentration in the silica particle suspension is, for example, preferably 10% by mass or more and 30% by mass or less.

Examples of the substance used as the supercritical fluid for supercritical drying include carbon dioxide, water, methanol, ethanol, acetone, and the like. From the viewpoint of treatment efficiency and from the viewpoint of suppressing the occurrence of coarse particles, the supercritical fluid is, for example, preferably supercritical carbon dioxide. Specifically, a step of using supercritical carbon dioxide is performed, for example, by the following operation.

The suspension is put in an airtight reactor, and then liquefied carbon dioxide is introduced into the reactor. Thereafter, the airtight reactor is heated, and the internal pressure of the airtight reactor is raised using a high-pressure pump such that the carbon dioxide in the airtight reactor is in a supercritical state. Then, the liquefied carbon dioxide is caused to flow into the airtight reactor, and the supercritical carbon dioxide is discharged from the airtight reactor, such that the supercritical carbon dioxide circulates in the suspension in the airtight reactor. While the supercritical carbon dioxide is circulating in the suspension, the solvent dissolves in the supercritical carbon dioxide and is removed along with the supercritical carbon dioxide discharged from the airtight reactor. The internal temperature and pressure of the airtight reactor are set such that the carbon dioxide is in a supercritical state. Because the critical point of carbon dioxide is 31.1° C./7.38 MPa, for example, the temperature is set to 40° C. or higher and 200° C. or lower, and the pressure is set to 10 MPa or higher and 30 MPa or lower. The flow rate of the supercritical fluid in the airtight reactor is, for example, preferably 80 mL/sec or more and 240 mL/sec or less.

It is preferable that the obtained silica particles, for example, be disintegrated or sieved such that coarse particles and aggregates are removed. The silica particles are disintegrated, for example, by a dry pulverizer such as a jet mill, a vibration mill, a ball mill, or a pin mill. The silica particles are sieved, for example, by a vibration sieve, a pneumatic sieving machine, or the like.

Silica Particles (S2)

The amount of the silica particles (S2) added to the exterior of the toner particles with respect to 100 parts by mass of the toner particles is, for example, preferably 0.1 parts by mass or more and 5.0 parts by mass or less, more preferably 0.3 parts by mass or more and 2.5 parts by mass or less, and even more preferably 0.7 parts by mass or more and 1.7 parts by mass or less.

The average primary particle size D2 of the silica particles (S2) is, for example, preferably 10 nm or more and 90 nm or less, more preferably 15 nm or more and 80 nm or less, and even more preferably 20 nm or more and 70 nm or less.

A degree of hydrophobicity of the silica particles (S2) is, for example, preferably 40% or more and 90% or less, more preferably 45% or more and 85% or less, and even more preferably 50% or more and 80% or less.

In a case where the degree of hydrophobicity of the silica particles (S2) is 40% or more, the water content of the silica particles (S2) is appropriately reduced. As a result, aggregation of the toner is suppressed, and the toner has excellent fluidity.

In a case where the degree of hydrophobicity of the silica particles (S2) is 90% or less, the silica particles (S2) have an appropriate water content. As a result, the toner is not excessively charged, the repulsion between toners is suppressed, and the toner has excellent fluidity.

A ratio H2/H1 of a degree of hydrophobicity H2 of the silica particles (S2) to a degree of hydrophobicity H1 of the silica particles (S1) is, for example, preferably 0.7 or more and 9.0 or less, more preferably 0.8 or more and 5.0 or less, and even more preferably 0.9 or more and 3.0 or less.

In a case where the ratio H2/H1 0.7 or more, the overall water content of the silica particles is appropriately reduced. As a result, aggregation of the toner is suppressed, and the toner has excellent fluidity.

In a case where the ratio H2/H1 9.0 or less, the overall water content of the silica particles is appropriately reduced. As a result, the toner is not excessively charged, repulsion of the toner is suppressed, and the toner has excellent fluidity.

The method of measuring the degree of hydrophobicity of the silica particles is as follows.

Silica particles (0.2% by mass) are added to 50 ml of deionized water. While the mixture is being stirred with a magnetic stirrer, methanol is added dropwise thereto from a burette, and the mass fraction of methanol in the mixed solution of methanol/water at a point in time when the entirety of the sample is precipitated is determined and adopted as a degree of hydrophobicity.

As the silica particles (S2), for example, hydrophobic silica particles (S2) are preferable which are obtained by treating the surface of silica particles, such as sol-gel silica, aqueous colloidal silica, alcoholic silica, fumed silica, and molten silica, with a hydrophobic agent (for example, a silane-based coupling agent, a silicone oil, a titanate-based coupling agent, or an aluminum-based coupling agent).

Layered Compound Particles

From the viewpoint of suppressing the occurrence of color streaks resulting from the abrasion of an image holder-cleaning blade, for example, it is preferable that layered compound particles be added to the exterior of the toner according to the present exemplary embodiment. The layered compound particles are particles of a compound having a layered structure in which an interlayer distance is in the order of angstrom. It is considered that the lubricating action that the layered compound particles exhibit may result from the layers that are irregularly stacked. The layered compound particles added to the exterior of the toner act as a lubricant at a contact portion between an image holder and a cleaning blade.

The toner according to the present exemplary embodiment contains the silica particles (S1) containing an appropriate amount of a nitrogen element-containing compound, in which the positively polarized nitrogen atom exerts an anchoring effect on the negatively charged toner particles. Therefore, it is relatively easy for the silica particles (S1) to stay on the surface of the negatively charged toner particles.

Furthermore, compared to other silica particles, the silica particles (S1) are more likely to attract the layered compound particles. Presumably, as a result, the layered compound particles may use the silica particles (S1) as a mediator and thus are relatively unlikely to be isolated from the toner particles.

Presumably, therefore, the layered compound particles may roll together with the toner particles by using the silica particles (S1) as a mediator, which may allow the layered compound particles to be relatively evenly supplied to both the image portion and non-image portion on the surface of the image holder.

The layered compound particles supplied to the surface of the image holder act as a lubricant at the contact portion between the image holder and the cleaning blade. In the toner according to the present exemplary embodiment, the layered compound particles are relatively evenly supplied to both the image portion and a non-image portion on the surface of the image holder. Therefore, the abrasion of the cleaning blade is stably suppressed. For example, even after images each clearly divided into an image portion and a non-image portion are continuously formed on the image holder, abrasion of the entire cleaning blade is suppressed, which suppresses the occurrence of color streaks.

Examples of the layered compound particles include melamine cyanurate particles, boron nitride particles, graphite fluoride particles, molybdenum disulfide particles, mica particles, and the like.

As the layered compound particles, from the viewpoint of exhibiting an excellent lubricating action, for example, melamine cyanurate particles are preferable.

From the viewpoint of suppressing aggregation of the layered compound particles, the average primary particle size of the layered compound particles is, for example, preferably 1 or more, more preferably 1.5 μm or more, and even more preferably 2 μm or more.

From the viewpoint of preventing damage of the image holder-cleaning blade, the average primary particle size of the layered compound particles is, for example, preferably 10 or less, more preferably 8 μm or less, and even more preferably 6 μm or less.

The average primary particle size of the layered compound particles can be controlled by pulverization, classification, or a combination of pulverization and classification.

From the viewpoint of suppressing aggregation of the melamine cyanurate particles, the average primary particle size of the melamine cyanurate particles is, for example, preferably 1 μm or more, more preferably 1.5 μm or more, and even more preferably 2 μm or more.

From the viewpoint of preventing damage of the image holder-cleaning blade, the average primary particle size of the melamine cyanurate particles is, for example, preferably 10 μm or less, more preferably 8 μm or less, and even more preferably 6 μm or less.

The average primary particle size of the melamine cyanurate particles can be controlled by pulverization, classification, or a combination of pulverization and classification.

The average primary particle size of the layered compound particles is measured by the following method.

First, the layered compound particles are separated from the toner. There is no limitation on the method of separating the layered compound particles from the toner. For example, the toner is dispersed in water containing a surfactant to prepare a dispersion, ultrasonic waves are applied thereto, and then the dispersion is centrifuged at a high speed such that the toner particles, the silica particles, and the layered compound particles are centrifugally separated by specific gravity. A fraction containing the layered compound particles is extracted and dried, thereby obtaining the layered compound particles.

Then, an aqueous electrolyte solution (aqueous isotonic solution) is added to the layered compound particles, and ultrasonic waves are applied thereto for 30 seconds or longer to disperse the particles. By using the dispersion as a sample, the particle size is measured with a laser diffraction scattering-type particle size distribution analyzer (for example, MICROTRAC MT3000II manufactured by Microtrac Retsch GmbH), and the particle size below which the cumulative percentage of particles having a smaller particle size in a volume-based particle size distribution is 50% is adopted as the average primary particle size.

For the layered compound particles and the melamine cyanurate particles are, for example, preferably particles having monodisperse particles as primary particles, and a CV value relating to the particle size of the primary particles is, for example, preferably 10% or less. The CV value is an index showing that the particles are monodisperse particles, and is obtained by the following equation.

$$CV \text{ value}=(\text{standard deviation}/\text{average particle size})\times 100$$

From the viewpoint of obtaining the action of the layered compound particles, the total amount of the layered compound particles added to the exterior of the toner particles with respect to 100 parts by mass of the toner particles is, for example, preferably 0.02 parts by mass or more, more preferably 0.03 parts by mass or more, and even more preferably 0.05 parts by mass or more.

From the viewpoint of suppressing aggregation of the layered compound particles, the total amount of the layered compound particles added to the exterior of the toner particles with respect to 100 parts by mass of the toner particles is, for example, preferably 0.2 parts by mass or less, more preferably 0.15 parts by mass or less, and even more preferably 0.1 part by mass or less.

A mass-based ratio M3/M1 of a total content M3 of the layered compound particles contained in the toner to a content M1 of the silica particles (S1) contained in the toner is, for example, preferably 0.009 or more and 0.4 or less, more preferably 0.05 or more and 0.2 or less, and even more preferably 0.10 or more and 0.15 or less.

From the viewpoint of obtaining the action of the melamine cyanurate particles, the amount of the melamine cyanurate particles added to the exterior of the toner particles with respect to 100 parts by mass of the toner particles is, for example, preferably 0.02 parts by mass or more, more preferably 0.03 parts by mass or more, and even more preferably 0.05 parts by mass or more.

From the viewpoint of suppressing aggregation of the melamine cyanurate particles, the amount of the melamine cyanurate particles added to the exterior of the toner particles with respect to 100 parts by mass of the toner particles is, for example, preferably 0.2 parts by mass or less, more preferably 0.15 parts by mass or less, and even more preferably 0.1 parts by mass or less.

A mass-based ratio M3/M1 of a content M3 of the melamine cyanurate particles contained in the toner to a content M1 of the silica particles (S1) contained in the toner is, for example, preferably 0.009 or more and 0.4 or less, more preferably 0.05 or more and 0.2 or less, and even more preferably 0.10 or more and 0.15 or less.

Other External Additives

In addition to the silica particles (S1), the silica particles (S2), and the layered compound particles, other external additives may be added to the exterior of the toner according to the present exemplary embodiment.

Examples of the aforementioned other external additives include inorganic particles such as $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobic agent is, for example, 1 part by mass or more and 10 parts by mass or less with respect to 100 parts by mass of the inorganic particles.

Examples of the external additives include resin particles such as polystyrene, polymethyl methacrylate, and a melamine resin.

The amount of such other external additives added to the exterior of the toner particles with respect to the toner particles is, for example, preferably 0.01% by mass or more and 5% by mass or less, and more preferably 0.01% by mass or more and 2.0% by mass or less.

Manufacturing Method of Toner

The toner according to the present exemplary embodiment is obtained by manufacturing toner particles and then adding external additives to the exterior of the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and known manufacturing methods are adopted. Among the above methods, for example, the aggregation and coalescence method may be used for obtaining toner particles.

Specifically, for example, in a case where the toner particles are manufactured by the aggregation and coalescence method, the toner particles are manufactured through a step of preparing a resin particle dispersion in which resin particles to be a binder resin are dispersed (a resin particle dispersion-preparing step), a step of allowing the resin particles (plus other particles as necessary) to be aggregated in the resin particle dispersion (having been mixed with another particle dispersion as necessary) to form aggregated particles (aggregated particle-forming step), and a step of heating an aggregated particle dispersion in which the aggregated particles are dispersed to allow the aggregated particles to undergo coalescence and to form toner particles (coalescence step).

Hereinafter, each of the steps will be specifically described.

In the following section, a method for obtaining toner particles containing a colorant and a release agent will be described. The colorant and the release agent are used as necessary. It goes without saying that other additives different from the colorant and the release agent may also be used.

Resin Particle Dispersion-Preparing Step

For example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 μm or less, more preferably 0.08 or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Aggregated Particle-Forming Step

Next, the resin particle dispersion is mixed with the colorant particle dispersion and the release agent particle dispersion.

Then, in the mixed dispersion, the resin particles, the colorant particles, and the release agent particles are heteroaggregated such that aggregated particles are formed which have a diameter close to the diameter of the target toner particles and include the resin particles, the colorant particles, and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the resin particles (specifically, for example, to a temperature equal to or higher than the glass transition temperature of the resin particles −30° C. and equal to or lower than the glass transition temperature of the resin particles −10° C.) such that the particles dispersed in the mixed dispersion are aggregated, thereby forming aggregated particles. In the aggregated particle-forming step, for example, in a state where the mixed dispersion is being stirred with a rotary shearing homogenizer, an aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) such that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed to cause the resin particles to be aggregated and adhere to the surface of the aggregated particles and to form second aggregated particles, and a step of heating a second aggregated particle dispersion in which the second aggregated particles are dispersed to cause the second aggregated particles to coalesce and to form toner particles having a core/shell structure.

After the coalescence step ends, the toner particles in the dispersion are subjected to known washing step, solid-liquid separation step, and drying step, thereby obtaining dry toner particles. As the washing step, from the viewpoint of charging properties, for example, displacement washing may be thoroughly performed using deionized water. As the solid-liquid separation step, from the viewpoint of productivity, for example, suction filtration, pressure filtration, or the like may be performed. As the drying step, from the viewpoint of productivity, for example, freeze-drying, flush drying, fluidized drying, vibratory fluidized drying, or the like may be performed.

Then, for example, by adding an external additive to the obtained dry toner particles and mixing together the external additive and the toner particles, the toner according to the present exemplary embodiment is manufactured. The mixing may be performed, for example, using a V blender, a Henschel mixer, a Lodige mixer, or the like. As necessary, coarse particles of the toner may be removed using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin and; a resin impregnation-type carrier obtained by impregnating porous magnetic powder with a resin; and the like.

Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the toner and the carrier, represented by toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In a case where the image forming apparatus according to the present exemplary embodiment is the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming means) adopting an electrophotographic method that prints out images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are detachable from the image forming apparatus.

An intermediate transfer belt (an example of an intermediate transfer member) 20 passing through the units 10Y, 10M, 10C, and 10K extends above the units. The intermediate transfer belt 20 is looped around a driving roll 22 and a support roll 24, and runs toward a fourth unit 10K from a first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the surface of the intermediate transfer belt 20 on the side of the image holding surface.

Toners of yellow, magenta, cyan, and black, stored in containers of toner cartridges 8Y, 8M, 8C, and 8K are supplied to developing devices (an example of developing units) 4Y, 4M, 4C, and 4K of units 10Y, 10M, 10C, and 10K, respectively.

The first to fourth units 10Y, 10M, 10C, and 10K have the same configuration and perform the same operation. Therefore, in the present specification, as a representative, the first unit 10Y will be described which is placed on the upstream side of the running direction of the intermediate transfer belt and forms a yellow image.

The first unit 10Y has a photoreceptor 1Y that acts as an image holder. Around the photoreceptor 1Y, a charging roll (an example of charging unit) 2Y that charges the surface of the photoreceptor 1Y at a predetermined potential, an exposure device (an example of electrostatic charge image forming unit) 3 that exposes the charged surface to a laser beam 3Y based on color-separated image signals to form an electrostatic charge image, a developing device (an example of developing unit) 4Y that develops the electrostatic charge image by supplying a charged toner to the electrostatic charge image, a primary transfer roll (an example of primary transfer unit) 5Y that transfers the developed toner image onto the intermediate transfer belt 20, and a photoreceptor cleaning device (an example of cleaning unit) 6Y that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. A bias power supply (not shown in the drawing) for applying a primary transfer bias is connected to primary transfer rolls 5Y, 5M, 5C, and 5K of each unit. Each bias power supply changes the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 3, the laser beam 3Y is radiated to the surface of the charged photoreceptor 1Y according to the image data for yellow transmitted from the control unit not shown in the drawing. As a result, an electrostatic charge image of the yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y rotates to a predetermined development position as the photoreceptor 1Y runs. At the development position, the electrostatic charge image on the photoreceptor 1Y is developed as a toner image by the developing device 4Y and visualized.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown in the drawing).

The residual toner on the photoreceptor 1Y is removed by a photoreceptor cleaning device 6Y and collected.

The primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of a secondary transfer unit) disposed on the side of the image holding surface of the intermediate transfer belt 20. Meanwhile, via a supply mechanism, recording paper P (an example of a recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Then, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are suitably used.

The recording paper P on which the color image has been fixed is transported to an output portion, and a series of color image forming operations is finished.

Process Cartridge and Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
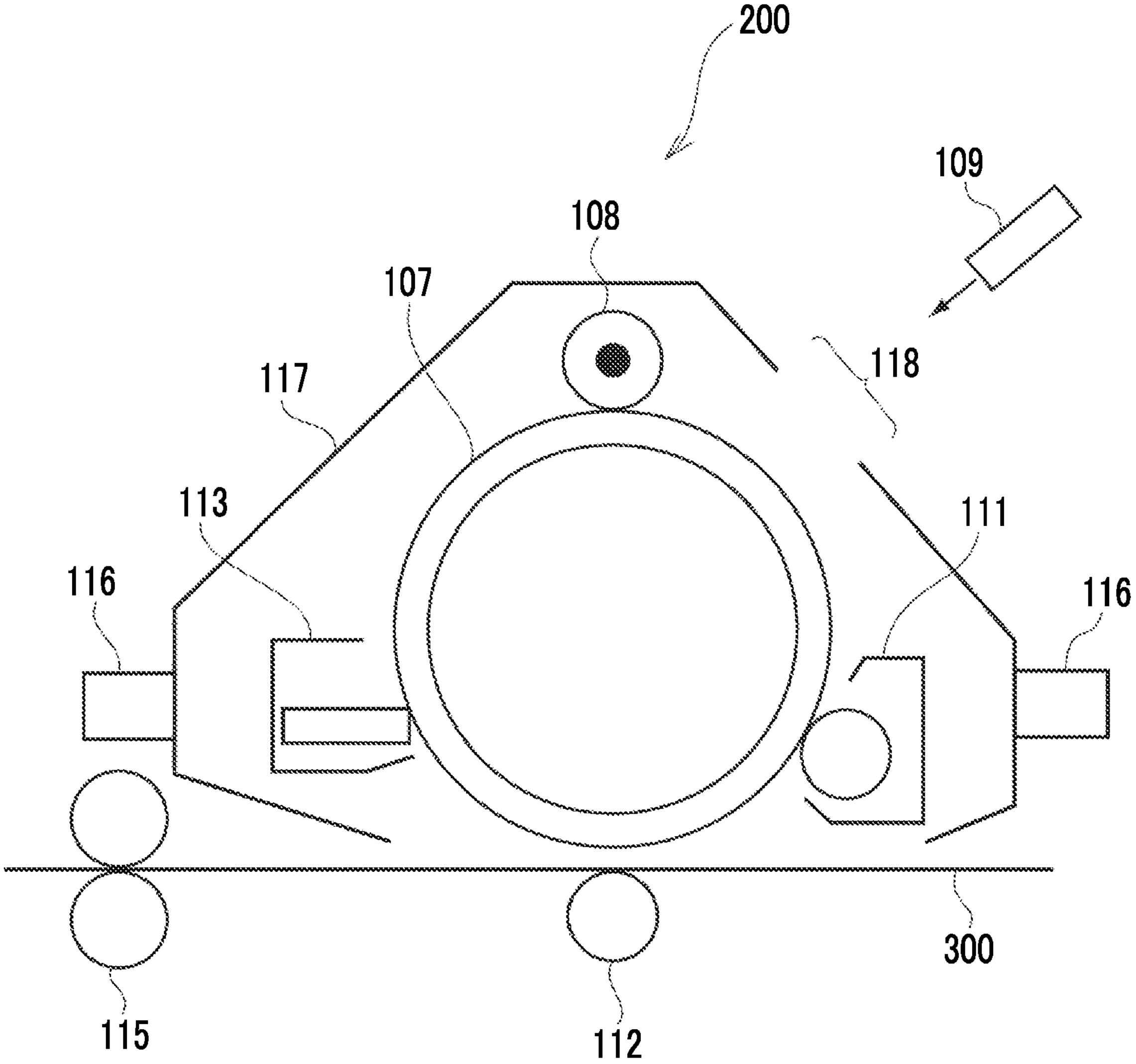
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a transfer device (an example of a transfer unit), 115 represents a fixing device (an example of a fixing unit), and 300 represents recording paper (an example of a recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Manufacturing of Carrier

Cyclohexyl methacrylate resin (weight-average molecular weight 50,000): 54 parts Carbon black (manufactured by Cabot Corporation, VXC72): 6 parts Toluene: 250 parts Isopropyl alcohol: 50 parts The above materials and glass beads (diameter 1 mm, the same amount as toluene) are put in a sand mill and stirred at a rotation speed of 190 rpm for 30 minutes, thereby obtaining a coating agent.

Ferrite particles (1,000 parts, volume-average particle size of 35 μm) and 150 parts of the coating agent are put in a kneader and mixed together at room temperature (25° C.) for 20 minutes. Then, the mixture is heated to 70° C. and dried under reduced pressure. The dried product is cooled to room temperature (25° C.), taken out of the kneader, and sieved with a mesh having an opening size of 75 μm to remove coarse powder, thereby obtaining a carrier.

Manufacturing of Toner Particles

Preparation of Resin Particle Dispersion (1)

Ethylene glycol: 37 parts

Neopentyl glycol: 65 parts 1,9-Nonanediol: 32 parts

Terephthalic acid 96 parts

The above materials are put in a flask, the temperature is raised to 200° C. for 1 hour, and after it is confirmed that the inside of the reaction system is uniformly stirred, 1.2 parts of dibutyltin oxide is added. The temperature is raised to 240° C. for 6 hours in a state where the generated water is being distilled off, and stirring is continued at 240° C. for 4 hours, thereby obtaining a polyester resin (acid value 9.4 mgKOH/g, weight-average molecular weight 13,000, glass transition temperature 62° C.). The molten polyester resin is transferred as it is to an emulsifying disperser (CAVITRON CD1010, Eurotech Ltd.) at a rate of 100 g/min. Separately, dilute aqueous ammonia having a concentration of 0.37% obtained by diluting the reagent aqueous ammonia with deionized water is put in a tank and transferred to an emulsifying disperser together with the polyester resin at a rate of 0.1 L/min while being heated at 120° C. by a heat exchanger. The emulsifying disperser is operated under the conditions of a rotation speed of a rotor of 60 Hz and a pressure of 5 kg/$cm^2$, thereby obtaining a resin particle dispersion (1) having a volume-average particle size of 160 nm and a solid content of 30%.

Preparation of Resin Particle Dispersion (2)

Decanedioic acid: 81 parts

Hexanediol: 47 parts

The above materials are put in a flask, the temperature is raised to 160° C. for 1 hour, and after it is confirmed that the inside of the reaction system is uniformly stirred, 0.03 parts of dibutyltin oxide is added. While the generated water is being distilled off, the temperature is raised to 200° C. for 6 hours, and stirring is continued for 4 hours at 200° C. Thereafter, the reaction solution is cooled, solid-liquid separation is performed, and the solid is dried at a temperature of 40° C. under reduced pressure, thereby obtaining a polyester resin (C1) (melting point 64° C., weight-average molecular weight of 15,000).

Polyester resin (C1): 50 parts

Anionic surfactant (NEOGEN SC, manufactured by DKS Co. Ltd.): 2 parts

Deionized water: 200 parts

The above materials are heated to 120° C., thoroughly dispersed with a homogenizer (ULTRA-TURRAX T50, manufactured by IKA), and then subjected to a dispersion treatment with a pressure jet-type homogenizer. At a point in time when the volume-average particle size reaches 180 nm, the dispersed resultant is collected, thereby obtaining a resin particle dispersion (2) having a solid content of 20%.

Preparation of Colorant Particle Dispersion (1)

Cyan pigment (PigmentBlue 15:3, manufactured by Dainichiseika Color & Chemicals Mfg. Co., Ltd.): 50 parts Anionic surfactant (NEOGEN SC, manufactured by DKS Co. Ltd.): 2 parts Deionized water: 200 parts The above materials are mixed together and dispersed for 1 hour with a high-pressure impact disperser ULTIMIZER (HJP30006, manufactured by SUGINO MACHINE LIMITED), thereby obtaining a colorant particle dispersion (1) having a volume-average particle size of 180 nm and a solid content of 20%.

Preparation of Release Agent Particle Dispersion (1)

Paraffin wax (HNP-9, manufactured by NIPPON SEIRO CO., LTD.): 50 parts

Anionic surfactant (NEOGEN SC, manufactured by DKS Co. Ltd.): 2 parts

Deionized water: 200 parts

The above materials are heated to 120° C., thoroughly dispersed with a homogenizer (ULTRA-TURRAX T50, manufactured by IKA), and then subjected to a dispersion treatment with a pressure jet-type homogenizer. At a point in time when the volume-average particle size reaches 200 nm, the dispersed resultant is collected, thereby obtaining a release agent particle dispersion (1) having a solid content of 20%.

Preparation of Toner Particles (1)

Resin particle dispersion (1): 150 parts

Resin particle dispersion (2): 50 parts

Colorant particle dispersion (1): 25 parts

Release agent particle dispersion (1): 35 parts

Polyaluminum chloride: 0.4 parts

Deionized water: 100 parts

The above materials are put in a stainless steel flask, thoroughly mixed and dispersed together by using a homogenizer (ULTRA-TURRAX T50, IKA), and then heated to 48° C. in an oil bath for heating in a state where the inside of the flask is being stirred. The internal temperature of the reaction system is kept at 48° C. for 60 minutes, and then 70 parts of the resin particle dispersion (1) is slowly added thereto. Thereafter, the pH is adjusted to 8.0 by using a 0.5 mol/L aqueous sodium hydroxide solution, the flask is then sealed, heated to 90° C. while being continuously stirred with a stirring shaft with a magnetic seal, and kept at 90° C. for 30 minutes. Next, the mixture is cooled at a cooling rate of 5° C./min, subjected to solid-liquid separation, and thoroughly washed with deionized water. Then, the mixture is subjected to solid-liquid separation, redispersed in deionized water at 30° C., and stirred and washed at a rotation speed of 300 rpm for 15 minutes. This washing operation is repeated 6 more times, and at a point time when the pH of the filtrate reaches 7.54 and the electrical conductivity thereof reaches 6.5 μS/cm, solid-liquid separation is performed. The solids are dried in a vacuum for 24 hours, thereby obtaining toner particles (1). The volume-average particle size of the toner particles (1) is 5.7 μm.

Preparation of Toner Particles (2) to (5)

Toner particles (2) to (5) having different release agent exposure rates are separately prepared in the same manner as in the preparation of the toner particles (1), except that the amount of the release agent particle dispersion (1) added is changed.

Manufacturing of Silica Particles (S1)

Preparation of Alkali Catalyst Solution

Methanol, deionized water, and 10% aqueous ammonia ($NH_4OH$) in the amounts and concentrations shown in Table 1 are put into a glass reactor equipped with a metal stirring rod, a dripping nozzle, and a thermometer, and stirred and mixed together, thereby obtaining an alkali catalyst solution.

Granulation of Silica Base Particles by Sol-Gel Method

The temperature of the alkali catalyst solution is adjusted to 40° C., and the alkali catalyst solution is subjected to nitrogen purging. Then, while the alkali catalyst solution is being stirred at a liquid temperature kept at 40° C., tetramethoxysilane (TMOS) in the amount shown in Table 1 and 124 parts of aqueous ammonia ($NH_4OH$) having a catalyst ($NH_3$) concentration of 7.9% are simultaneously added dropwise to the solution, thereby obtaining a silica base particle suspension.

Addition of Silane Coupling Agent

While the silica base particle suspension is being stirred at a liquid temperature kept at 40° C., methyltrimethoxysilane (MTMS) (trifunctional silane coupling agent) in the amount shown in Table 1 is added thereto. After the addition ends, the obtained suspension is stirred for 120 minutes, such that MTMS reacts and at least a part of the surface of the silica base particles is coated with the reaction product of MTMS.

Addition of Nitrogen Element-Containing Compound

The nitrogen element-containing compound in the amount shown in Table 1 is diluted with butanol, thereby preparing an alcohol solution. The alcohol solution is added to the silica base particle suspension obtained after the reaction with the silane coupling agent, and the mixture is stirred for 100 minutes at a liquid temperature kept at 30° C. The amount of the alcohol solution added is set such that the number of parts of the nitrogen element-containing compound is as shown in Table 1 with respect to 100 parts by mass of the solids of the silica base particle suspension. "TP-415" in Table 1 is a quaternary ammonium salt of molybdic acid from Hodogaya Chemical Co., Ltd.

Drying

The suspension obtained after the addition of a nitrogen element-containing compound is moved to a reaction vessel for drying. While the suspension is being stirred, liquefied carbon dioxide is injected into the reaction vessel, the internal temperature and internal pressure of the reaction vessel are raised to 150° C. and 15 MPa respectively, and the suspension is continuously stirred in a state where the temperature and pressure are kept and the supercritical state of the carbon dioxide is maintained. The carbon dioxide is flowed in and out at a flow rate of 5 L/min, and the solvent is removed for 120 minutes, thereby obtaining silica particles (S1). Silica particles (S1-1) to (S1-11) are separately prepared by setting the type and amount of the materials used to the specifications shown in Table 1.

TABLE 1

| | Granulation of silica base particles | | | | Surface | Nitrogen element-containing compound | | Silica particles | | | |
|---|---|---|---|---|---|---|---|---|---|---|---|
| Silica particles (S1) Type — | Methanol Parts by mass | Water Parts by mass | 10% aqueous ammonia Parts by mass | TMOS Parts by mass | coating MTMS Parts by mass | Type — | Added amount Parts by mass | Average particle size nm | Volume resistivity (value of common logarithm) Log (Ω · cm) | Degree of hydrophobicity | Ratio N/Si — |
| (S1-4) | 900 | 63 | 6.7 | 850 | 20 | TP-415 | 0.1 | 66 | 11.0 | 23 | 0.001 |
| (S1-3) | 900 | 63 | 7.0 | 850 | 70 | TP-415 | 0.53 | 63 | 12.5 | 49 | 0.005 |
| (S1-2) | 900 | 76 | 8.0 | 850 | 22 | TP-415 | 5 | 62 | 8.2 | 26 | 0.041 |
| (S1-1) | 900 | 63 | 7.0 | 850 | 40 | TP-415 | 23 | 63 | 8.0 | 41 | 0.168 |
| (S1-10) | 900 | 60 | 6.8 | 840 | 50 | TP-415 | 25 | 50 | 8.3 | 44 | 0.174 |
| (S1-11) | 900 | 68 | 6.6 | 830 | 55 | TP-415 | 28 | 40 | 8.5 | 46 | 0.182 |
| (S1-5) | 900 | 63 | 7.0 | 850 | 190 | TP-415 | 45 | 62 | 10.9 | 55 | 0.371 |
| (S1-6) | 900 | 84 | 8.0 | 850 | 50 | TP-415 | 4 | 80 | 10.3 | 44 | 0.030 |
| (S1-7) | 900 | 63 | 7.0 | 850 | 50 | Phenethylamine | 5 | 60 | 10.6 | 49 | 0.453 |
| (S1-8) | 900 | 63 | 7.0 | 850 | 50 | 4-(2-Octylamino)diphenylamine | 5 | 60 | 10.5 | 46 | 0.218 |
| (S1-9) | 900 | 63 | 7.0 | 850 | 50 | N-benzyl-N-methylethanolamine | 5 | 60 | 10.3 | 49 | 0.412 |

Preparation of Silica Particles (S2)

Fumed silica is put in a reactor equipped with a stirrer and stirred to fluidized, and heated to 200° C. in the fluidized state. The nitrogen gas purging is performed in the reactor, the reactor is sealed, 25 parts of dimethyl silicone oil (viscosity 100 $mm^2/sec$) is sprayed on 100 parts of silica, and stirring is continued for 30 minutes. Thereafter, the internal temperature of the reactor is raised to 300° C. with stirring, and the mixture is further stirred for 2 hours. The mixture is cooled, taken out of the reactor, and subjected to a disintegration treatment, thereby obtaining silica particles (S2).

Silica particles (S2-1) to (S2-4) are separately prepared by adjusting the average primary particle size and average circularity of fumed silica and adjusting the amount of dimethyl silicone oil sprayed. Table 2 shows the average primary particle size, average circularity, and degree of hydrophobicity of the silica particles (S2-1) to (S2-4).

In all the silica particles (S2-1) to (S2-4), the mass ratio N/Si of a nitrogen element to a silicon element is less than 0.005.

Preparation of Melamine Cyanurate Particles

Commercially available melamine cyanurate (MC-4500 or MC-6000 manufactured by Nissan Chemical Corporation) is pulverized by a jet mill and classified, thereby obtaining melamine cyanurate particles (1) to (6) having different average primary particle sizes.

Manufacturing of Toner and Two-Component Developer

Examples 1 to 23 and Comparative Examples 1 and 2

Any of the toner particles (1) to (5) (100 parts), any of the silica particles (S1-1) to (S1-11), and any of the silica particles (S2-1) to (S2-4) are mixed together in a Henschel mixer, in the amounts shown in Table 2. Each of the obtained mixtures is sieved with a vibration sieve having an opening size of 45 μm, thereby obtaining toners. The toner (8 parts) and 100 parts of the carrier are put in a V blender, stirred, and sieved with a sieve having an opening size of 212 μm, thereby obtaining a two-component developer.

Examples 24 to 32

The toner particles (1) (100 parts), the silica particles (S1-1) or (S1-2), the silica particles (S2-1), and the melamine cyanurate particles (1) to (6) are mixed together in a Henschel mixer, in the amounts shown in Table 3. Each of the obtained mixtures is sieved with a vibration sieve having an opening size of 45 μm, thereby obtaining toners. The toner (8 parts) and 100 parts of the carrier are put in a V blender, stirred, and sieved with a sieve having an opening size of 212 μm, thereby obtaining a two-component developer.

Performance Evaluation

Fluidity of Toner

A modified image forming apparatus ApeosPort-II C7500 (manufactured by FUJIFILM Business Innovation Corp.) is prepared. This image forming apparatus includes a pipe having a relatively small diameter, a pipe bent in an L shape or the like, and a pipe without a transport auger in a toner transport path. That is, in this image forming apparatus, strong mechanical stress is applied to a toner in the toner transport path.

The developing device of the image forming apparatus is filled with the two-component developer of each example, and the toner cartridge having a container filled with the toner of each example is mounted on the image forming apparatus.

In an environment at a temperature of 32° C. and a relative humidity of 85%, images are formed on A4 size paper (CP paper manufactured by FUJIFILM Business Innovation Corp.). An image having a low image density (image area coverage 0.5%) is printed on both sides of 1,000 sheets of paper, and then an image having a high image density (image area coverage 30%) is printed on both sides of 1,000 sheets of paper. These images are continuously printed on a total of 100,000 sheets of paper.

While the images are being printed, abnormal sound (gear jumping sound, rubbing sound, vibration sound, or the like) in the toner transport path and toner clogging in the toner transport path are observed and classified according to the following criteria. The results are shown in Table 2.

A: No toner clogging occurs until 100,000 sheets are printed.

B: Toner clogging occurs at a stage where the number of printed sheets is 50,000 or more and less than 100,000.

C: Toner clogging occurs at a stage where the number of printed sheets is 10,000 or more and less than 50,000.

D: Toner clogging occurs at a stage where the number of printed sheets is less than 10,000.

Color Streaks

The toners and two-component developers of Examples 24 to 32 and Examples 1 and 2 are evaluated on the occurrence of color streaks.

A modified image forming apparatus ApeosPort-IV C7771 (manufactured by FUJIFILM Business Innovation Corp.) is prepared. The developing device of the image forming apparatus is filled with the two-component developer of each example, and the toner cartridge having a container filled with the toner of each example is mounted on the image forming apparatus.

In an environment at a temperature of 22° C. and a relative humidity of 50%, a cyan image having an image density of 1.5% is printed on 100,000 sheets of A4 size paper, and then an image chart formed by combining a solid cyan image and a halftone cyan image at a toner application amount of 0.1 mg/cm' is printed on 1 sheet of A4 size paper. The halftone image is visually observed, and a contact portion of the photoreceptor cleaning blade is observed with a microscope (VH6200 manufactured by KEYENCE CORPORATION) at 100× magnification. The number of color streaks occurring in the halftone image and the state of the contact portion of the photoreceptor cleaning blade are classified as follows.

G1: There are no color streaks, and the photoreceptor cleaning blade is not chipped.

G2: There are no color streaks, and the photoreceptor cleaning blade is chipped.

G3: There are 1 to 5 color streaks, and the photoreceptor cleaning blade is chipped.

G4: There are 6 or more color streaks, and the photoreceptor cleaning blade is chipped.

TABLE 2

| | Toner particles | | Silica particles (S1) | | | | | | | Silica particles (S2) | | | | | | | |
|---|---|---|---|---|---|---|---|---|---|---|---|---|---|---|---|---|
| | Type — | Release agent exposure rate % | Type — | Average primary particle size D1 nm | Volume resistivity (value of common logarithm) Log (Ω · cm) | Degree of hydrophobicity % | Rato N/Si — | Content M1 Number of parts with respect to 100 parts of toner particles | Type — | Average Primary Particle size D2 nm | Average circularity — | Degree of hydrophobicity % | Content M2 Number of parts with respect to 100 parts of toner particles | D1/D2 — | M1/M2 — | Fluidity of toner — |
| Comparative Example 1 | (1) | 30 | (S1-4) | 66 | 11.0 | 23 | 0.001 | 0.67 | (S2-1) | 40 | 0.88 | 40 | 1.10 | 1.7 | 0.6 | D |
| Example 3 | (1) | 30 | (S1-3) | 63 | 12.5 | 49 | 0.005 | 0.67 | (S2-1) | 40 | 0.88 | 40 | 1.10 | 1.6 | 0.6 | C |
| Example 2 | (1) | 30 | (S1-2) | 62 | 8.2 | 26 | 0.041 | 0.67 | (S2-1) | 40 | 0.88 | 40 | 1.10 | 1.6 | 0.6 | B |
| Example 1 | (1) | 30 | (S1-1) | 63 | 8.0 | 41 | 0.168 | 0.67 | (S2-1) | 40 | 0.88 | 40 | 1.10 | 1.6 | 0.6 | A |
| Example 22 | (1) | 30 | (S1-10) | 50 | 8.3 | 44 | 0.174 | 0.67 | (S2-1) | 40 | 0.88 | 40 | 1.10 | 1.3 | 0.6 | A |
| Example 23 | (1) | 30 | (S1-11) | 40 | 8.5 | 46 | 0.182 | 0.67 | (S2-1) | 40 | 0.88 | 40 | 1.10 | 1.0 | 0.6 | A |
| Example 4 | (1) | 30 | (S1-5) | 62 | 10.9 | 55 | 0.371 | 0.67 | (S2-1) | 40 | 0.88 | 40 | 1.10 | 1.6 | 0.6 | B |
| Example 5 | (1) | 30 | (S1-6) | 80 | 10.3 | 44 | 0.030 | 0.67 | (S2-1) | 40 | 0.88 | 40 | 1.10 | 2.0 | 0.6 | A |
| Example 6 | (1) | 30 | (S1-1) | 63 | 8.0 | 41 | 0.168 | 0.67 | (S2-2) | 10 | 0.90 | 30 | 1.10 | 6.3 | 0.6 | C |
| Example 7 | (1) | 30 | (S1-1) | 63 | 8.0 | 41 | 0.168 | 0.67 | (S2-3) | 60 | 0.84 | 35 | 1.10 | 1.1 | 0.6 | B |
| Comparative Example 2 | (1) | 30 | (S1-1) | 63 | 8.0 | 41 | 0.168 | 0.67 | (S2-4) | 42 | 0.82 | 35 | 1.10 | 1.5 | 0.6 | D |
| Example 8 | (1) | 30 | (S1-7) | 60 | 10.6 | 49 | 0.453 | 0.67 | (S2-1) | 40 | 0.88 | 40 | 1.10 | 1.5 | 0.6 | B |
| Example 9 | (1) | 30 | (S1-8) | 60 | 10.5 | 46 | 0.218 | 0.67 | (S2-1) | 40 | 0.88 | 40 | 1.10 | 1.5 | 0.6 | B |
| Example 10 | (1) | 30 | (S1-9) | 60 | 10.3 | 49 | 0.412 | 0.67 | (S2-1) | 40 | 0.88 | 40 | 1.10 | 1.5 | 0.6 | B |
| Example 11 | (1) | 30 | (S1-1) | 63 | 8.0 | 41 | 0.168 | 0.42 | (S2-1) | 40 | 0.88 | 40 | 2.10 | 1.6 | 0.2 | B |
| Example 12 | (1) | 30 | (S1-1) | 63 | 8.0 | 41 | 0.168 | 0.80 | (S2-1) | 40 | 0.88 | 40 | 1.60 | 1.6 | 0.5 | A |
| Example 13 | (1) | 30 | (S1-1) | 63 | 8.0 | 41 | 0.168 | 1.28 | (S2-1) | 40 | 0.88 | 40 | 1.60 | 1.6 | 0.8 | A |
| Example 14 | (1) | 30 | (S1-1) | 63 | 8.0 | 41 | 0.168 | 0.80 | (S2-1) | 40 | 0.88 | 40 | 0.53 | 1.6 | 1.5 | A |
| Example 15 | (1) | 30 | (S1-1) | 63 | 8.0 | 41 | 0.168 | 1.40 | (S2-1) | 40 | 0.88 | 40 | 0.70 | 1.6 | 2.0 | A |
| Example 16 | (1) | 30 | (S1-1) | 63 | 8.0 | 41 | 0.168 | 0.80 | (S2-1) | 40 | 0.88 | 40 | 0.32 | 1.6 | 2.5 | B |
| Example 17 | (1) | 30 | (S1-1) | 63 | 8.0 | 41 | 0.168 | 2.00 | (S2-1) | 40 | 0.88 | 40 | 0.40 | 1.6 | 5.0 | B |
| Example 18 | (2) | 12 | (S1-1) | 63 | 8.0 | 41 | 0.168 | 0.67 | (S2-1) | 40 | 0.88 | 40 | 1.10 | 1.6 | 0.6 | C |
| Example 19 | (3) | 15 | (S1-1) | 63 | 8.0 | 41 | 0.168 | 0.67 | (S2-1) | 40 | 0.88 | 40 | 1.10 | 1.6 | 0.6 | B |
| Example 20 | (4) | 40 | (S1-1) | 63 | 8.0 | 41 | 0.168 | 0.67 | (S2-1) | 40 | 0.88 | 40 | 1.10 | 1.6 | 0.6 | B |
| Example 21 | (5) | 42 | (S1-1) | 63 | 8.0 | 41 | 0.168 | 0.67 | (S2-1) | 40 | 0.88 | 40 | 1.10 | 1.6 | 0.6 | C |

TABLE 3

| | | Silica particles (S1) | | Silica particles (S2) | | Melamine cyanurate | | | | | |
|---|---|---|---|---|---|---|---|---|---|---|---|
| | Toner particle Type — | Type — | Content M1 Number of parts with respect to 100 parts of toner particles | Type — | Content M2 Number of parts with respect to 100 parts of toner particles | Type — | Average primary particle size µm | Content M3 Number of parts with respect to 100 parts of toner particles | M3/M1 — | Fluidity of toner — | Color streaks — |
| Example 24 | (1) | (S1-2) | 0.67 | (S2-1) | 1.10 | (1) | 2.8 | 0.090 | 0.134 | A | G1 |
| Example 25 | (1) | (S1-1) | 0.67 | (S2-1) | 1.10 | (2) | 4.5 | 0.090 | 0.134 | A | G1 |
| Example 26 | (1) | (S1-2) | 0.67 | (S2-1) | 1.10 | (1) | 2.8 | 0.045 | 0.067 | A | G2 |
| Example 27 | (1) | (S1-1) | 0.67 | (S2-1) | 1.10 | (3) | 2.0 | 0.060 | 0.090 | A | G2 |
| Example 28 | (1) | (S1-2) | 0.67 | (S2-1) | 1.10 | (1) | 2.8 | 0.020 | 0.030 | A | G3 |
| Example 29 | (1) | (S1-2) | 0.67 | (S2-1) | 1.10 | (4) | 1.0 | 0.090 | 0.134 | A | G3 |
| Example 30 | (1) | (S1-1) | 0.67 | (S2-1) | 1.10 | (5) | 10 | 0.045 | 0.067 | A | G3 |
| Example 31 | (1) | (S1-1) | 0.67 | (S2-1) | 1.10 | (1) | 2.8 | 0.010 | 0.015 | A | G4 |
| Example 32 | (1) | (S1-1) | 0.67 | (S2-1) | 1.10 | (6) | 11 | 0.090 | 0.134 | A | G4 |
| Example 1 | (1) | (S1-1) | 0.67 | (S2-1) | 1.10 | — | — | 0 | — | A | G4 |
| Example 2 | (1) | (S1-2) | 0.67 | (S2-1) | 1.10 | — | — | 0 | — | B | G4 |

(((1)))

An electrostatic charge image developing toner comprising:

negatively charged toner particles; and silica particles added to an exterior of the toner particles, wherein in a case where the silica particles are sorted into silica particles (S1) having a circularity of 0.91 or more and silica particles (S2) having a circularity less than 0.91, a mass ratio N/Si of a nitrogen element to a silicon element in a group of the silica particles (S1) is 0.005 or more and 0.50 or less, a mass ratio N/Si of a nitrogen element to a silicon element in a group of the silica particles (S2) is less than 0.005, and an average circularity of the silica particles (S2) is 0.84 or more and less than 0.91.

(((2)))

The electrostatic charge image developing toner according to (((1))), wherein the mass ratio N/Si of the nitrogen element to the silicon element in the group of the silica particles (S1) is 0.015 or more and 0.20 or less.

(((3)))

The electrostatic charge image developing toner according to (((1))) or (((2))), wherein the silica particles (S1) include silica particles having a coating structure that consists of a reaction product of a trifunctional silane coupling agent and a nitrogen element-containing compound that has adhered to the coating structure.

(((4)))

The electrostatic charge image developing toner according to any one of (((1))) to (((3))), wherein a ratio D1/D2 of an average primary particle size D1 of the silica particles (S1) to an average primary particle size D2 of the silica particles (S2) is 1 or more and 5 or less.

(((5)))

The electrostatic charge image developing toner according to any one of (((1))) to (((4))), wherein an average primary particle size D1 of the silica particles (S1) is 30 nm or more and 90 nm or less.

(((6)))

The electrostatic charge image developing toner according to any one of (((1))) to (((5))), wherein a volume resistivity of the silica particles (S1) is $1.0\times10^{8}$ Ω·cm or more and $1.0\times10^{12.5}$ Ω·cm or less.

(((7)))

The electrostatic charge image developing toner according to any one of (((1))) to (((6))), wherein a degree of hydrophobicity of the silica particles (S1) is 10% or more and 60% or less.

(((8)))

The electrostatic charge image developing toner according to any one of (((1))) to (((7))), wherein a mass-based ratio M1/M2 of a content M1 of the silica particles (S1) to a content M2 of the silica particles (S2) is 0.2 or more and 5.0 or less.

(((9)))

The electrostatic charge image developing toner according to any one of (((1))) to (((8))), wherein a degree of hydrophobicity of the silica particles (S2) is 40% or more and 90% or less.

(((10)))

The electrostatic charge image developing toner according to any one of (((1))) to (((9))), wherein a release agent exposure rate on a surface of the toner particles is 15% or more and 40% or less.

(((11)))

The electrostatic charge image developing toner according to any one of (((1))) to (((10))), further comprising:

layered compound particles added to the exterior of the toner particles, wherein a content of the layered compound particles is 0.02 parts by mass or more and 0.2 parts by mass or less with respect to 100 parts by mass of the toner particles.

(((12)))

The electrostatic charge image developing toner according to (((11))), wherein a mass-based ratio M3/M1 of a content M3 of the layered compound particles to the content M1 of the silica particles (S1) is 0.009 or more and 0.4 or less.

(((13)))

The electrostatic charge image developing toner according to (((11))) or (((12))), wherein an average primary particle size of the layered compound particles is 1 μm or more and 10 μm or less.

(((14)))

The electrostatic charge image developing toner according to any one of (((1))) to (((10))), further comprising melamine cyanurate particles added to the exterior of the toner particles, wherein a content of the melamine cyanurate particles is 0.02 parts by mass or more and 0.2 parts by mass or less with respect to 100 parts by mass of the toner particles.

(((15)))

The electrostatic charge image developing toner according to (((14))), wherein a mass-based ratio M3/M1 of a content M3 of the melamine cyanurate particles to the content M1 of the silica particles (S1) is 0.009 or more and 0.4 or less.

(((16)))

The electrostatic charge image developing toner according to (((14))) or (((15))), wherein an average primary particle size of the melamine cyanurate particles is 1 μm or more and 10 μm or less.

(((17)))

An electrostatic charge image developer comprising:

the electrostatic charge image developing toner according to any one of (((1))) to (((16))).

(((18)))

A toner cartridge comprising:

a container that contains the electrostatic charge image developing toner according to any one of (((1))) to (((16))), wherein the toner cartridge is detachable from an image forming apparatus.

(((19)))

A process cartridge comprising:

a developing unit that contains the electrostatic charge image developer according to claim 17))) and develops an electrostatic charge image formed on a surface of an image holder as a toner image by using the electrostatic charge image developer, wherein the process cartridge is detachable from an image forming apparatus.

(((20)))

An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to (((17))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

(((21)))

An image forming method comprising:

charging a surface of an image holder;

forming an electrostatic charge image on the charged surface of the image holder;

developing the electrostatic charge image formed on the surface of the image holder as a toner image by using the electrostatic charge image developer according to (((17)));

transferring the toner image formed on the surface of the image holder to a surface of a recording medium; and fixing the toner image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

negatively charged toner particles; and silica particles added to an exterior of the toner particles, wherein in a case where the silica particles are sorted into silica particles (S1) having a circularity of 0.91 or more and silica particles (S2) having a circularity less than 0.91, a mass ratio N/Si of a nitrogen element to a silicon element in a group of the silica particles (S1) is 0.005 or more and 0.50 or less, a mass ratio N/Si of a nitrogen element to a silicon element in a group of the silica particles (S2) is less than 0.005, an average circularity of the silica particles (S2) is 0.84 or more and less than 0.91, and the silica particles (S1) include silica particles having a coating structure that consists of a reaction product of a trifunctional silane coupling agent and a nitrogen element-containing compound that has adhered to the coating structure.

2. The electrostatic charge image developing toner according to claim 1, wherein the mass ratio N/Si of the nitrogen element to the silicon element in the group of the silica particles (S1) is 0.015 or more and 0.20 or less.

3. The electrostatic charge image developing toner according to claim 1, wherein a ratio D1/D2 of an average primary particle size D1 of the silica particles (S1) to an average primary particle size D2 of the silica particles (S2) is 1 or more and 5 or less.

4. The electrostatic charge image developing toner according to claim 1, wherein an average primary particle size D1 of the silica particles (S1) is 30 nm or more and 90 nm or less.

5. The electrostatic charge image developing toner according to claim 1, wherein a volume resistivity of the silica particles (S1) is $1.0\times10^{8}$ Ω·cm or more and $1.0\times10^{12.5}$ Ω·cm or less.

6. The electrostatic charge image developing toner according to claim 1, wherein a degree of hydrophobicity of the silica particles (S1) is 10% or more and 60% or less.

7. The electrostatic charge image developing toner according to claim 1, wherein a mass-based ratio M1/M2 of a content M1 of the silica particles (S1) to a content M2 of the silica particles (S2) is 0.2 or more and 5.0 or less.

8. The electrostatic charge image developing toner according to claim 1, wherein a release agent exposure rate on a surface of the toner particles is 15% or more and 40% or less.

9. The electrostatic charge image developing toner according to claim 1, further comprising:

layered compound particles added to the exterior of the toner particles, wherein a content of the layered compound particles is 0.02 parts by mass or more and 0.2 parts by mass or less with respect to 100 parts by mass of the toner particles.

10. The electrostatic charge image developing toner according to claim 9, wherein a mass-based ratio M3/M1 of a content M3 of the layered compound particles to a content M1 of the silica particles (S1) is 0.009 or more and 0.4 or less.

11. The electrostatic charge image developing toner according to claim 9, wherein an average primary particle size of the layered compound particles is 1 μm or more and 10 μm or less.

12. The electrostatic charge image developing toner according to claim 1, further comprising melamine cyanurate particles added to the exterior of the toner particles, wherein a content of the melamine cyanurate particles is 0.02 parts by mass or more and 0.2 parts by mass or less with respect to 100 parts by mass of the toner particles.

13. The electrostatic charge image developing toner according to claim 12, wherein a mass-based ratio M3/M1 of a content M3 of the melamine cyanurate particles to the content M1 of the silica particles (S1) is 0.009 or more and 0.4 or less.

14. The electrostatic charge image developing toner according to claim 12, wherein an average primary particle size of the melamine cyanurate particles is 1 μm or more and 10 μm or less.

15. An electrostatic charge image developer comprising:

the electrostatic charge image developing toner according to claim 1.

16. A toner cartridge comprising:

a container that contains the electrostatic charge image developing toner according to claim 1, wherein the toner cartridge is detachable from an image forming apparatus.

17. A process cartridge comprising:

a developing unit that contains the electrostatic charge image developer according to claim 15 and develops an electrostatic charge image formed on a surface of an image holder as a toner image by using the electrostatic charge image developer, wherein the process cartridge is detachable from an image forming apparatus.

18. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 16 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

19. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 15;

transferring the toner image formed on the surface of the image holder to a surface of a recording medium; and fixing the toner image transferred to the surface of the recording medium.

* * * * *